US007373007B2

(12) United States Patent
Sakuyama et al.

(10) Patent No.: US 7,373,007 B2
(45) Date of Patent: May 13, 2008

(54) ENCODED DATA GENERATION APPARATUS AND A METHOD, A PROGRAM, AND AN INFORMATION RECORDING MEDIUM

(75) Inventors: Hiroyuki Sakuyama, Tokyo (JP); Tooru Suino, Kanagawa (JP); Michael Gormish, Menlo Park, CA (US)

(73) Assignee: Ricoh Company, Ltd., Tokyo (JP)

( * ) Notice: Subject to any disclaimer, the term of this patent is extended or adjusted under 35 U.S.C. 154(b) by 918 days.

(21) Appl. No.: 10/837,446

(22) Filed: Apr. 30, 2004

(65) Prior Publication Data

US 2005/0015247 A1 Jan. 20, 2005

(30) Foreign Application Priority Data

Apr. 30, 2003 (JP) ............................ 2003-125667

(51) Int. Cl.
*G06K 9/36* (2006.01)
*G06K 9/46* (2006.01)

(52) U.S. Cl. ...................................... 382/240; 382/248

(58) Field of Classification Search ................ 382/232, 382/240, 248, 251
See application file for complete search history.

(56) References Cited

U.S. PATENT DOCUMENTS 6,792,153 B1 * 9/2004 Tsujii ......................... 382/239
6,865,291 B1 * 3/2005 Zador ......................... 382/166

FOREIGN PATENT DOCUMENTS

JP 05-227320 9/1993

OTHER PUBLICATIONS

Nomizu, Yasuyuki, "Next-generation Image Encoding Method JPEG 2000," Triceps, Inc., Feb. 13, 2001.

Katto, Jiro and Yasuda, Yasuhiko, "Performance Evaluation of Subband Coding and Optimization of Its Filter Coefficients," Journal of Visual Communication and Image Representation, vol. 2, No. 4, Dec. 1991, pp. 303-313.

Nadenau, Marcus J. and Reichel, Julien, "Opponent Color, Human Vision and Wavelets for Image Compression," Proceedings of the Seventh Color Imaging Conference, Scottsdale, Arizona, Nov. 16-19, 1999, IS&T, pp. 237-242.

Nadenau, Marcus J. et al., "Wavelet-Based Color Image Compression, Exploiting the Contrast Sensitivity Function," IEEE Transactions on Image Processing, vol. 12, No. 1, Jan. 2003, pp. 58-70.

* cited by examiner

*Primary Examiner*—Phuoc Tran
(74) *Attorney, Agent, or Firm*—Blakely, Sokoloff, Taylor & Zafman LLP

(57) ABSTRACT

An encoding process and a recompression process of encoded data are disclosed that appropriately select low-order bit planes and low-order sub bit planes, codes corresponding to which are not to be output. The low-order bit planes and low-order sub bit planes are selected based on an inverse value of the square root of the subband gain of inverse wavelet transform, such that the selected low-order bit planes and low-order sub bit planes are not encoded, or alternatively, are encoded, but later discarded during packet generation.

24 Claims, 36 Drawing Sheets

FIG.8

LOW PASS even
HIGH PASS odd

P(0) X Y

| | | | | | | | | | | | | | | | | | |
|---|---|---|---|---|---|---|---|---|---|---|---|---|---|---|---|---|---|
| LOW PASS | even | −3 | −16 | −19 | −42 | −51 | −59 | −70 | −77 | −73 | −68 | −62 | −49 | −38 | −27 | −15 | −10 |
| HIGH PASS | odd | −3 | −10 | −24 | −32 | −44 | −65 | −70 | −79 | −79 | −77 | −68 | −53 | −46 | −32 | −22 | −17 |
| | even | −2 | −10 | −23 | −34 | −45 | −64 | −76 | −80 | −83 | −76 | −75 | −60 | −48 | −39 | −25 | −17 |
| Y | odd | −2 | −7 | −22 | −31 | −45 | −60 | −73 | −78 | −83 | −78 | −77 | −66 | −55 | −42 | −29 | −25 |
| | even | 0 | −6 | −21 | −31 | −50 | −66 | −74 | −81 | −86 | −81 | −76 | −68 | −64 | −42 | −30 | −28 |
| | odd | 2 | −13 | −27 | −35 | −45 | −61 | −74 | −84 | −85 | −86 | −79 | −69 | −64 | −52 | −44 | −24 |
| | even | −4 | −15 | −23 | −38 | −46 | −60 | −74 | −84 | −89 | −82 | −81 | −75 | −69 | −57 | −46 | −27 |
| | odd | 1 | −10 | −25 | −36 | −47 | −62 | −72 | −83 | −80 | −65 | −75 | −80 | −78 | −66 | −47 | −33 |
| | even | 3 | −10 | −23 | −38 | −46 | −63 | −72 | −78 | −83 | −88 | −84 | −72 | −63 | −64 | −64 | −42 |
| | odd | −1 | −11 | −24 | −35 | −43 | −65 | −69 | −80 | −78 | −84 | −81 | −68 | −68 | −73 | −72 | −60 |
| | even | −2 | −11 | −24 | −36 | −41 | −61 | −72 | −76 | −79 | −81 | −80 | −83 | −85 | −77 | −74 | −70 |
| | odd | −3 | −15 | −23 | −35 | −40 | −60 | −72 | −80 | −80 | −85 | −85 | −81 | −82 | −83 | −73 | −72 |
| | even | −4 | −12 | −18 | −34 | −43 | −56 | −69 | −65 | −74 | −77 | −82 | −83 | −85 | −80 | −80 | −70 |
| | odd | −5 | −15 | −22 | −32 | −43 | −56 | −67 | −76 | −80 | −75 | −83 | −82 | −86 | −82 | −80 | −76 |
| | even | −4 | −13 | −22 | −32 | −45 | −56 | −68 | −76 | −74 | −76 | −82 | −82 | −83 | −83 | −78 | −75 |
| | odd | −6 | −11 | −23 | −34 | −45 | −54 | −70 | −75 | −78 | −84 | −79 | −81 | −84 | −85 | −85 | −78 |

P(15)

FIG.10

| even | odd | even | odd | | | | | | | | | | | | |
|---|---|---|---|---|---|---|---|---|---|---|---|---|---|---|---|
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |

FIG.12

| | | | | | | | | | | | | | | | |
|---|---|---|---|---|---|---|---|---|---|---|---|---|---|---|---|
| 2LL | 2LL | 2LL | 2LL | 2HL | 2HL | 2HL | 2HL | 1HL | 1HL | 1HL | 1HL | 1HL | 1HL | 1HL | 1HL |
| 2LL | 2LL | 2LL | 2LL | 2HL | 2HL | 2HL | 2HL | 1HL | 1HL | 1HL | 1HL | 1HL | 1HL | 1HL | 1HL |
| 2LL | 2LL | 2LL | 2LL | 2HL | 2HL | 2HL | 2HL | 1HL | 1HL | 1HL | 1HL | 1HL | 1HL | 1HL | 1HL |
| 2LL | 2LL | 2LL | 2LL | 2HL | 2HL | 2HL | 2HL | 1HL | 1HL | 1HL | 1HL | 1HL | 1HL | 1HL | 1HL |
| 2LH | 2LH | 2LH | 2LH | 2HH | 2HH | 2HH | 2HH | 1HL | 1HL | 1HL | 1HL | 1HL | 1HL | 1HL | 1HL |
| 2LH | 2LH | 2LH | 2LH | 2HH | 2HH | 2HH | 2HH | 1HL | 1HL | 1HL | 1HL | 1HL | 1HL | 1HL | 1HL |
| 2LH | 2LH | 2LH | 2LH | 2HH | 2HH | 2HH | 2HH | 1HL | 1HL | 1HL | 1HL | 1HL | 1HL | 1HL | 1HL |
| 2LH | 2LH | 2LH | 2LH | 2HH | 2HH | 2HH | 2HH | 1HL | 1HL | 1HL | 1HL | 1HL | 1HL | 1HL | 1HL |
| 1LH | 1LH | 1LH | 1LH | 1LH | 1LH | 1LH | 1LH | 1HH | 1HH | 1HH | 1HH | 1HH | 1HH | 1HH | 1HH |
| 1LH | 1LH | 1LH | 1LH | 1LH | 1LH | 1LH | 1LH | 1HH | 1HH | 1HH | 1HH | 1HH | 1HH | 1HH | 1HH |
| 1LH | 1LH | 1LH | 1LH | 1LH | 1LH | 1LH | 1LH | 1HH | 1HH | 1HH | 1HH | 1HH | 1HH | 1HH | 1HH |
| 1LH | 1LH | 1LH | 1LH | 1LH | 1LH | 1LH | 1LH | 1HH | 1HH | 1HH | 1HH | 1HH | 1HH | 1HH | 1HH |
| 1LH | 1LH | 1LH | 1LH | 1LH | 1LH | 1LH | 1LH | 1HH | 1HH | 1HH | 1HH | 1HH | 1HH | 1HH | 1HH |
| 1LH | 1LH | 1LH | 1LH | 1LH | 1LH | 1LH | 1LH | 1HH | 1HH | 1HH | 1HH | 1HH | 1HH | 1HH | 1HH |
| 1LH | 1LH | 1LH | 1LH | 1LH | 1LH | 1LH | 1LH | 1HH | 1HH | 1HH | 1HH | 1HH | 1HH | 1HH | 1HH |
| 1LH | 1LH | 1LH | 1LH | 1LH | 1LH | 1LH | 1LH | 1HH | 1HH | 1HH | 1HH | 1HH | 1HH | 1HH | 1HH |

FIG.13

| | | | |
|---|---|---|---|
| 0 | 1 | 2 | 3 |
| 4 | 5 | 6 | 7 |
| 8 | 9 | 10 | 11 |
| 12 | 13 | 14 | 15 |

FIG.14

| | | | |
|---|---|---|---|
| 0 | 0 | 0 | 0 |
| 0 | 0 | 0 | 0 |
| 1 | 1 | 1 | 1 |
| 1 | 1 | 1 | 1 |

| | | | |
|---|---|---|---|
| 0 | 0 | 0 | 0 |
| 1 | 1 | 1 | 1 |
| 0 | 0 | 0 | 0 |
| 1 | 1 | 1 | 1 |

| | | | |
|---|---|---|---|
| 0 | 0 | 1 | 1 |
| 0 | 0 | 1 | 1 |
| 0 | 0 | 1 | 1 |
| 0 | 0 | 1 | 1 |

| | | | |
|---|---|---|---|
| 0 | 1 | 0 | 1 |
| 0 | 1 | 0 | 1 |
| 0 | 1 | 0 | 1 |
| 0 | 1 | 0 | 1 |

FIG.15

| | | | |
|---|---|---|---|
| c | c | c | c |
| c | c | c | c |
| c | c | c | c |
| c | c | c | c |

MSB BIT PLANE

| | | | |
|---|---|---|---|
| c | p | p | p |
| p | p | p | p |
| r | r | r | r |
| r | r | r | r |

| | | | |
|---|---|---|---|
| p | p | p | p |
| r | r | r | r |
| r | r | r | r |
| r | r | r | r |

| | | | |
|---|---|---|---|
| p | p | r | r |
| r | r | r | r |
| r | r | r | r |
| r | r | r | r |

LSB BIT PLANE p:SIGNIFICANCE PROPAGATION, r:MAGNITUDE REFINEMENT, c:CLEANUP

FIG.16

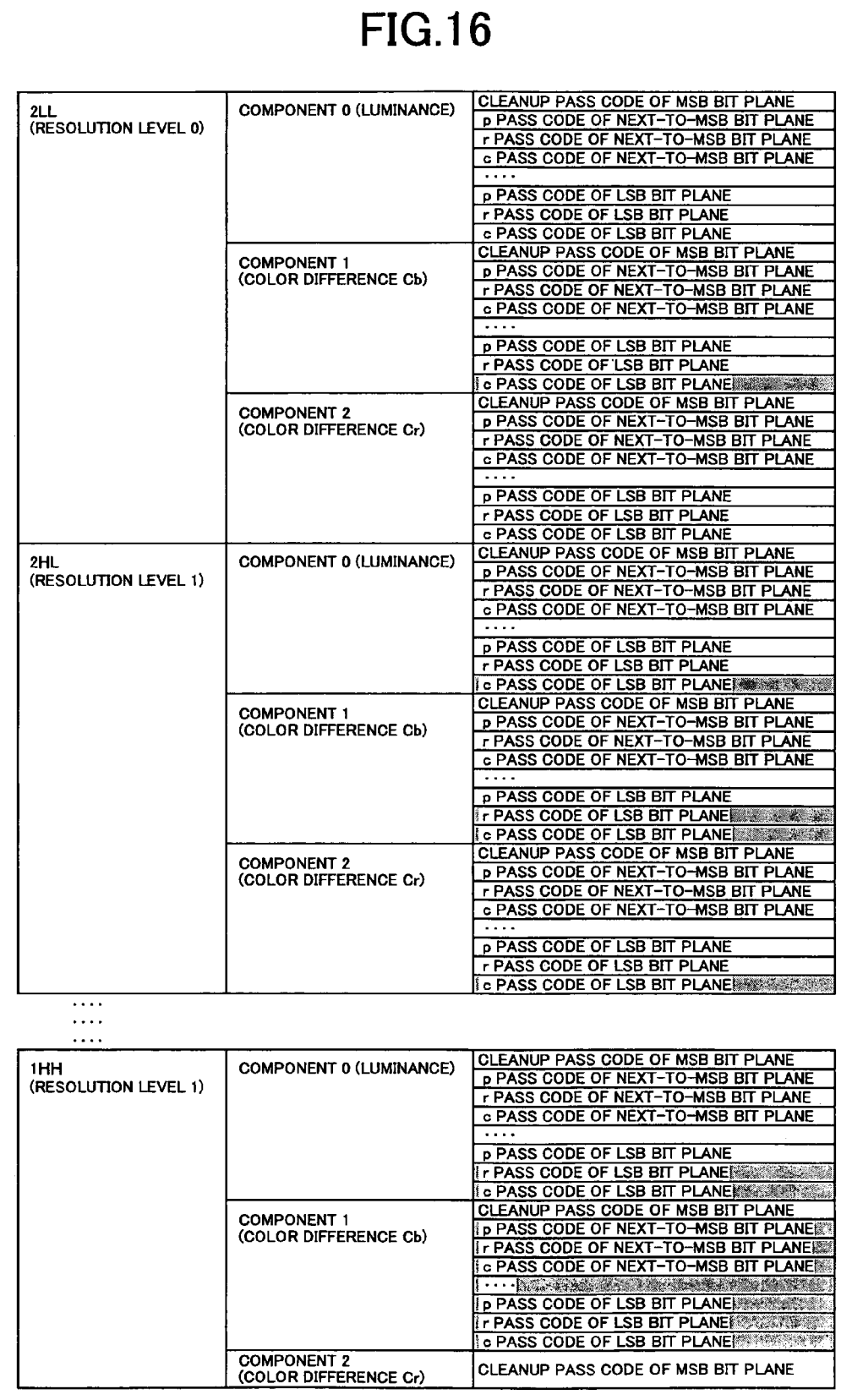

| | | |
|---|---|---|
| 2LL (RESOLUTION LEVEL 0) | COMPONENT 0 (LUMINANCE) | CLEANUP PASS CODE OF MSB BIT PLANE |
| | | p PASS CODE OF NEXT-TO-MSB BIT PLANE |
| | | r PASS CODE OF NEXT-TO-MSB BIT PLANE |
| | | c PASS CODE OF NEXT-TO-MSB BIT PLANE |
| | | .... |
| | | p PASS CODE OF LSB BIT PLANE |
| | | r PASS CODE OF LSB BIT PLANE |
| | | c PASS CODE OF LSB BIT PLANE |
| | COMPONENT 1 (COLOR DIFFERENCE Cb) | CLEANUP PASS CODE OF MSB BIT PLANE |
| | | p PASS CODE OF NEXT-TO-MSB BIT PLANE |
| | | r PASS CODE OF NEXT-TO-MSB BIT PLANE |
| | | c PASS CODE OF NEXT-TO-MSB BIT PLANE |
| | | .... |
| | | p PASS CODE OF LSB BIT PLANE |
| | | r PASS CODE OF LSB BIT PLANE |
| | | c PASS CODE OF LSB BIT PLANE |
| | COMPONENT 2 (COLOR DIFFERENCE Cr) | CLEANUP PASS CODE OF MSB BIT PLANE |
| | | p PASS CODE OF NEXT-TO-MSB BIT PLANE |
| | | r PASS CODE OF NEXT-TO-MSB BIT PLANE |
| | | c PASS CODE OF NEXT-TO-MSB BIT PLANE |
| | | .... |
| | | p PASS CODE OF LSB BIT PLANE |
| | | r PASS CODE OF LSB BIT PLANE |
| | | c PASS CODE OF LSB BIT PLANE |
| 2HL (RESOLUTION LEVEL 1) | COMPONENT 0 (LUMINANCE) | CLEANUP PASS CODE OF MSB BIT PLANE |
| | | p PASS CODE OF NEXT-TO-MSB BIT PLANE |
| | | r PASS CODE OF NEXT-TO-MSB BIT PLANE |
| | | c PASS CODE OF NEXT-TO-MSB BIT PLANE |
| | | .... |
| | | p PASS CODE OF LSB BIT PLANE |
| | | r PASS CODE OF LSB BIT PLANE |
| | | c PASS CODE OF LSB BIT PLANE |
| | COMPONENT 1 (COLOR DIFFERENCE Cb) | CLEANUP PASS CODE OF MSB BIT PLANE |
| | | p PASS CODE OF NEXT-TO-MSB BIT PLANE |
| | | r PASS CODE OF NEXT-TO-MSB BIT PLANE |
| | | c PASS CODE OF NEXT-TO-MSB BIT PLANE |
| | | .... |
| | | p PASS CODE OF LSB BIT PLANE |
| | | r PASS CODE OF LSB BIT PLANE |
| | | c PASS CODE OF LSB BIT PLANE |
| | COMPONENT 2 (COLOR DIFFERENCE Cr) | CLEANUP PASS CODE OF MSB BIT PLANE |
| | | p PASS CODE OF NEXT-TO-MSB BIT PLANE |
| | | r PASS CODE OF NEXT-TO-MSB BIT PLANE |
| | | c PASS CODE OF NEXT-TO-MSB BIT PLANE |
| | | .... |
| | | p PASS CODE OF LSB BIT PLANE |
| | | r PASS CODE OF LSB BIT PLANE |
| | | c PASS CODE OF LSB BIT PLANE |

....
....
....

| | | |
|---|---|---|
| 1HH (RESOLUTION LEVEL 1) | COMPONENT 0 (LUMINANCE) | CLEANUP PASS CODE OF MSB BIT PLANE |
| | | p PASS CODE OF NEXT-TO-MSB BIT PLANE |
| | | r PASS CODE OF NEXT-TO-MSB BIT PLANE |
| | | c PASS CODE OF NEXT-TO-MSB BIT PLANE |
| | | .... |
| | | p PASS CODE OF LSB BIT PLANE |
| | | r PASS CODE OF LSB BIT PLANE |
| | | c PASS CODE OF LSB BIT PLANE |
| | COMPONENT 1 (COLOR DIFFERENCE Cb) | CLEANUP PASS CODE OF MSB BIT PLANE |
| | | p PASS CODE OF NEXT-TO-MSB BIT PLANE |
| | | r PASS CODE OF NEXT-TO-MSB BIT PLANE |
| | | c PASS CODE OF NEXT-TO-MSB BIT PLANE |
| | | .... |
| | | p PASS CODE OF LSB BIT PLANE |
| | | r PASS CODE OF LSB BIT PLANE |
| | | c PASS CODE OF LSB BIT PLANE |
| | COMPONENT 2 (COLOR DIFFERENCE Cr) | CLEANUP PASS CODE OF MSB BIT PLANE |

FIG.17

| | DECOMPOSITION LEVEL | |
|---|---|---|
| | 2 | 1 |
| LL | 2.3 | |
| HL | 1.6 | 1.0 |
| LH | 1.6 | 1.0 |
| HH | 1.1 | 0.7 |

FIG.18

| | DECOMPOSITION LEVEL | |
|---|---|---|
| | 2 | 1 |
| LL | 0.4 | |
| HL | 0.6 | 1.0 |
| LH | 0.6 | 1.0 |
| HH | 0.9 | 1.4 |

FIG.19

| | DECOMPOSITION LEVEL | |
|---|---|---|
| | 2 | 1 |
| LL | 1 | |
| HL | 2 | 2 |
| LH | 2 | 2 |
| HH | 2 | 3 |

FIG.20

| | DECOMPOSITION LEVEL | |
|---|---|---|
| | 2 | 1 |
| LL | 3 | |
| HL | 5 | 7 |
| LH | 5 | 7 |
| HH | 7 | 8 |

FIG.22

| Y | DECOMPOSITION LEVEL | |
|---|---|---|
| | 2 | 1 |
| LL | 1.00 | |
| HL | 1.00 | 0.8 |
| LH | 1.00 | 0.8 |
| HH | 1.00 | 0.6 |

FIG.23

| | DECOMPOSITION LEVEL | |
|---|---|---|
| | 2 | 1 |
| LL | 0.45 | |
| HL | 0.64 | 1.27 |
| LH | 0.64 | 1.27 |
| HH | 0.93 | 2.43 |

FIG.24

| | DECOMPOSITION LEVEL | |
|---|---|---|
| | 2 | 1 |
| LL | 1 | |
| HL | 2 | 2 |
| LH | 2 | 2 |
| HH | 2 | 3 |

FIG.25

| | DECOMPOSITION LEVEL | |
|---|---|---|
| | 2 | 1 |
| LL | 3 | |
| HL | 5 | 8 |
| LH | 5 | 8 |
| HH | 7 | 11 |

FIG.26

| | DECOMPOSITION LEVEL | |
|---|---|---|
| | 2 | 1 |
| LL | 3.9 | |
| HL | 2.0 | 1.0 |
| LH | 2.0 | 1.0 |
| HH | 1.0 | 0.5 |

FIG.27

| | DECOMPOSITION LEVEL | |
|---|---|---|
| | 2 | 1 |
| LL | 0.3 | |
| HL | 0.5 | 1.0 |
| LH | 0.5 | 1.0 |
| HH | 1.0 | 1.9 |

FIG.28

| | DECOMPOSITION LEVEL | |
|---|---|---|
| | 2 | 1 |
| LL | 1.3 | |
| HL | 2.5 | 4.9 |
| LH | 2.5 | 4.9 |
| HH | 4.9 | 9.6 |

FIG.29

| | DECOMPOSITION LEVEL | |
|---|---|---|
| | 2 | 1 |
| LL | 0.2 | |
| HL | 0.2 | 0.3 |
| LH | 0.2 | 0.3 |
| HH | 0.2 | 0.3 |

FIG.30

| | DECOMPOSITION LEVEL | |
|---|---|---|
| | 2 | 1 |
| LL | 2 | |
| HL | 2 | 3 |
| LH | 2 | 3 |
| HH | 2 | 3 |

FIG.31

| | DECOMPOSITION LEVEL | |
|---|---|---|
| | 2 | 1 |
| LL | 7 | |
| HL | 7 | 8 |
| LH | 7 | 8 |
| HH | 7 | 9 |

FIG.32

| | |
|---|---|
| Y | 1.7 |
| Cb | 1.8 |
| Cr | 1.6 |

FIG.33

| | |
|---|---|
| Y | 1.7 |
| Cb | 0.8 |
| Cr | 0.8 |

FIG.34

| Cb | DECOMPOSITION LEVEL | |
|---|---|---|
| | 2 | 1 |
| LL | 1.0 | |
| HL | 0.5 | 0.2 |
| LH | 0.5 | 0.2 |
| HH | 0.3 | 0.1 |

FIG.35

| Cr | DECOMPOSITION LEVEL | |
|---|---|---|
| | 2 | 1 |
| LL | 1.0 | |
| HL | 0.6 | 0.3 |
| LH | 0.6 | 0.3 |
| HH | 0.4 | 0.2 |

FIG.36

| Y | DECOMPOSITION LEVEL | |
|---|---|---|
| | 2 | 1 |
| LL | 0.12 | |
| HL | 0.12 | 0.15 |
| LH | 0.12 | 0.15 |
| HH | 0.12 | 0.20 |

| Cb | DECOMPOSITION LEVEL | |
|---|---|---|
| | 2 | 1 |
| LL | 0.11 | |
| HL | 0.25 | 0.48 |
| LH | 0.25 | 0.48 |
| HH | 0.36 | 0.97 |

| Cr | DECOMPOSITION LEVEL | |
|---|---|---|
| | 2 | 1 |
| LL | 0.13 | |
| HL | 0.23 | 0.38 |
| LH | 0.23 | 0.38 |
| HH | 0.30 | 0.63 |

FIG.37

Y

| | DECOMPOSITION LEVEL | |
|---|---|---|
| | 2 | 1 |
| LL | 2 | |
| HL | 2 | 2 |
| LH | 2 | 2 |
| HH | 2 | 3 |

Cb

| | DECOMPOSITION LEVEL | |
|---|---|---|
| | 2 | 1 |
| LL | 2 | |
| HL | 3 | 4 |
| LH | 3 | 4 |
| HH | 3 | 5 |

Cr

| | DECOMPOSITION LEVEL | |
|---|---|---|
| | 2 | 1 |
| LL | 2 | |
| HL | 3 | 4 |
| LH | 3 | 4 |
| HH | 3 | 4 |

FIG.38

Y

| | DECOMPOSITION LEVEL | |
|---|---|---|
| | 2 | 1 |
| LL | 5 | |
| HL | 5 | 7 |
| LH | 5 | 7 |
| HH | 5 | 8 |

Cb

| | DECOMPOSITION LEVEL | |
|---|---|---|
| | 2 | 1 |
| LL | 5 | |
| HL | 9 | 12 |
| LH | 9 | 12 |
| HH | 10 | 15 |

Cr

| | DECOMPOSITION LEVEL | |
|---|---|---|
| | 2 | 1 |
| LL | 6 | |
| HL | 8 | 11 |
| LH | 8 | 11 |
| HH | 10 | 13 |

FIG.39

| TRANSITION STATE | 2LL | 2HL | 2LH | 2HH | 1HL | 1LH | 1HH |
|---|---|---|---|---|---|---|---|
| 0 | 0.45 | 0.64 | 0.64 | 0.93 | 1.27 | 1.27 | 2.43 |
| 1 | 0.45 | 0.64 | 0.64 | 0.93 | 1.27 | 1.27 | 1.21 |
| 2 | 0.45 | 0.64 | 0.64 | 0.93 | 1.27 | 0.64 | 1.21 |
| 3 | 0.45 | 0.64 | 0.64 | 0.93 | 0.64 | 0.64 | 1.21 |
| 4 | 0.45 | 0.64 | 0.64 | 0.93 | 0.64 | 0.64 | 0.61 |
| 5 | 0.45 | 0.64 | 0.64 | 0.47 | 0.64 | 0.64 | 0.61 |
| 6 | 0.45 | 0.64 | 0.64 | 0.47 | 0.32 | 0.64 | 0.61 |
| 7 | 0.45 | 0.64 | 0.64 | 0.47 | 0.32 | 0.32 | 0.61 |
| 8 | 0.45 | 0.64 | 0.32 | 0.47 | 0.32 | 0.32 | 0.61 |
| ... | ... | ... | ... | ... | ... | ... | ... |

LH DISCARDED WITH PREFERENCE

HIGH REGION DISCARDED WITH PREFERENCE, LH DISCARDED WITH PREFERENCE

| ID OF DISCARDING COMBINATION PATTERN | 2LL | 2HL | 2LH | 2HH | 1HL | 1LH | 1HH |
|---|---|---|---|---|---|---|---|
| 0 | 0 | 0 | 0 | 0 | 0 | 0 | 0 |
| 1 | 0 | 0 | 0 | 0 | 0 | 0 | 1 |
| 2 | 0 | 0 | 0 | 0 | 0 | 1 | 1 |
| 3 | 0 | 0 | 0 | 0 | 1 | 1 | 1 |
| 4 | 0 | 0 | 0 | 0 | 1 | 1 | 2 |
| 5 | 0 | 0 | 0 | 1 | 1 | 1 | 2 |
| 6 | 0 | 0 | 0 | 1 | 2 | 1 | 2 |
| 7 | 0 | 0 | 0 | 1 | 2 | 2 | 2 |
| 8 | 0 | 0 | 1 | 1 | 2 | 2 | 2 |
| ... | ... | ... | ... | ... | ... | ... | ... |

FIG.41

| TRANSITION STATE | 2YLL | 2YHL | 2YLH | 2YHH | 1YHL | 1YLH | 1YHH | 2CbLL | 2CbHL | 2CbLH | 2CbHH | 1CbHL | 1CbLH | 1CbHH | 2CrLL | 2CrHL | 2CrLH | 2CrHH | 1CrHL | 1CrLH | 1CrHH |
|---|---|---|---|---|---|---|---|---|---|---|---|---|---|---|---|---|---|---|---|---|---|
| 0 | 0.12 | 0.12 | 0.12 | 0.12 | 0.15 | 0.15 | 0.20 | 0.11 | 0.25 | 0.25 | 0.36 | 0.48 | 0.48 | 0.97 | 0.13 | 0.23 | 0.23 | 0.30 | 0.38 | 0.38 | 0.63 |
| 1 | 0.12 | 0.12 | 0.12 | 0.12 | 0.15 | 0.15 | 0.20 | 0.11 | 0.25 | 0.25 | 0.36 | 0.48 | 0.48 | 0.49 | 0.13 | 0.23 | 0.23 | 0.30 | 0.38 | 0.38 | 0.63 |
| 2 | 0.12 | 0.12 | 0.12 | 0.12 | 0.15 | 0.15 | 0.20 | 0.11 | 0.25 | 0.25 | 0.36 | 0.48 | 0.48 | 0.49 | 0.13 | 0.23 | 0.23 | 0.30 | 0.38 | 0.38 | 0.32 |
| 3 | 0.12 | 0.12 | 0.12 | 0.12 | 0.15 | 0.15 | 0.20 | 0.11 | 0.25 | 0.25 | 0.36 | 0.48 | 0.48 | 0.24 | 0.13 | 0.23 | 0.23 | 0.30 | 0.38 | 0.38 | 0.32 |
| 4 | 0.12 | 0.12 | 0.12 | 0.12 | 0.15 | 0.15 | 0.20 | 0.11 | 0.25 | 0.25 | 0.36 | 0.48 | 0.24 | 0.24 | 0.13 | 0.23 | 0.23 | 0.30 | 0.38 | 0.38 | 0.32 |
| 5 | 0.12 | 0.12 | 0.12 | 0.12 | 0.15 | 0.15 | 0.20 | 0.11 | 0.25 | 0.25 | 0.36 | 0.24 | 0.24 | 0.24 | 0.13 | 0.23 | 0.23 | 0.30 | 0.38 | 0.38 | 0.32 |
| 6 | 0.12 | 0.12 | 0.12 | 0.12 | 0.15 | 0.15 | 0.20 | 0.11 | 0.25 | 0.25 | 0.36 | 0.24 | 0.24 | 0.24 | 0.13 | 0.23 | 0.23 | 0.30 | 0.38 | 0.19 | 0.32 |
| 7 | 0.12 | 0.12 | 0.12 | 0.12 | 0.15 | 0.15 | 0.20 | 0.11 | 0.25 | 0.25 | 0.36 | 0.24 | 0.24 | 0.24 | 0.13 | 0.23 | 0.23 | 0.30 | 0.19 | 0.19 | 0.32 |
| 8 | 0.12 | 0.12 | 0.12 | 0.12 | 0.15 | 0.15 | 0.20 | 0.11 | 0.25 | 0.25 | 0.18 | 0.24 | 0.24 | 0.24 | 0.13 | 0.23 | 0.23 | 0.30 | 0.19 | 0.19 | 0.32 |
| ... | ... | ... | ... | ... | ... | ... | ... | ... | ... | ... | ... | ... | ... | ... | ... | ... | ... | ... | ... | ... | ... |

| ID OF DISCARDING COMBINATION PATTERN | 2YLL | 2YHL | 2YLH | 2YHH | 1YHL | 1YLH | 1YHH | 2CbLL | 2CbHL | 2CbLH | 2CbHH | 1CbHL | 1CbLH | 1CbHH | 2CrLL | 2CrHL | 2CrLH | 2CrHH | 1CrHL | 1CrLH | 1CrHH |
|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 1 | 0 | 0 | 0 | 0 | 0 | 0 | 0 |
| 2 | 0 | 0 | 0 | 0 | 0 | 0 | 0 | 0 | 0 | 0 | 0 | 0 | 0 | 1 | 0 | 0 | 0 | 0 | 0 | 0 | 1 |
| 3 | 0 | 0 | 0 | 0 | 0 | 0 | 0 | 0 | 0 | 0 | 0 | 0 | 0 | 2 | 0 | 0 | 0 | 0 | 0 | 0 | 1 |
| 4 | 0 | 0 | 0 | 0 | 0 | 0 | 0 | 0 | 0 | 0 | 0 | 0 | 1 | 2 | 0 | 0 | 0 | 0 | 0 | 0 | 1 |
| 5 | 0 | 0 | 0 | 0 | 0 | 0 | 0 | 0 | 0 | 0 | 0 | 1 | 1 | 2 | 0 | 0 | 0 | 0 | 0 | 0 | 1 |
| 6 | 0 | 0 | 0 | 0 | 0 | 0 | 0 | 0 | 0 | 0 | 0 | 1 | 1 | 2 | 0 | 0 | 0 | 0 | 0 | 1 | 1 |
| 7 | 0 | 0 | 0 | 0 | 0 | 0 | 0 | 0 | 0 | 0 | 0 | 1 | 1 | 2 | 0 | 0 | 0 | 0 | 1 | 1 | 1 |
| 8 | 0 | 0 | 0 | 0 | 0 | 0 | 0 | 0 | 0 | 0 | 1 | 1 | 1 | 2 | 0 | 0 | 0 | 0 | 1 | 1 | 1 |
| ... | ... | ... | ... | ... | ... | ... | ... | ... | ... | ... | ... | ... | ... | ... | ... | ... | ... | ... | ... | ... | ... |

FIG.42

| TRANSITION STATE | 2LL | 2HL | 2LH | 2HH | 1HL | 1LH | 1HH | |
|---|---|---|---|---|---|---|---|---|
| 0 | 0.45 | 0.64 | 0.64 | 0.93 | 1.27 | 1.27 | 2.43 | |
| 1 | 0.45 | 0.64 | 0.64 | 0.93 | 1.27 | 1.27 | 1.93 | |
| 2 | 0.45 | 0.64 | 0.64 | 0.93 | 1.27 | 1.27 | 1.53 | LH DISCARDED WITH PREFERENCE |
| 3 | 0.45 | 0.64 | 0.64 | 0.93 | 1.27 | 1.27 | 1.21 | |
| 4 | 0.45 | 0.64 | 0.64 | 0.93 | 1.27 | 1.01 | 1.21 | |
| 5 | 0.45 | 0.64 | 0.64 | 0.93 | 1.01 | 1.01 | 1.21 | |
| 6 | 0.45 | 0.64 | 0.64 | 0.93 | 1.01 | 1.01 | 0.96 | LH DISCARDED WITH PREFERENCE |
| 7 | 0.45 | 0.64 | 0.64 | 0.93 | 1.01 | 0.80 | 0.96 | |
| 8 | 0.45 | 0.64 | 0.64 | 0.93 | 0.80 | 0.80 | 0.96 | |
| ... | ... | ... | ... | ... | ... | ... | ... | |

| ID OF DISCARDING COMBINATION PATTERN | 2LL | 2HL | 2LH | 2HH | 1HL | 1LH | 1HH |
|---|---|---|---|---|---|---|---|
| 0 | 0 | 0 | 0 | 0 | 0 | 0 | 0 |
| 1 | 0 | 0 | 0 | 0 | 0 | 0 | 1 |
| 2 | 0 | 0 | 0 | 0 | 0 | 0 | 2 |
| 3 | 0 | 0 | 0 | 0 | 0 | 0 | 3 |
| 4 | 0 | 0 | 0 | 0 | 0 | 1 | 3 |
| 5 | 0 | 0 | 0 | 0 | 1 | 1 | 3 |
| 6 | 0 | 0 | 0 | 0 | 1 | 1 | 4 |
| 7 | 0 | 0 | 0 | 0 | 1 | 2 | 4 |
| 8 | 0 | 0 | 0 | 0 | 2 | 2 | 4 |
| ... | ... | ... | ... | ... | ... | ... | ... |

FIG.44

| TRANSITION STATE | 2LL | 2HL | 2LH | 2HH | 1HL | 1LH | 1HH | |
|---|---|---|---|---|---|---|---|---|
| 0 | 0.45 | 0.64 | 0.64 | 0.93 | 1.27 | 1.27 | 2.43 | |
| 1 | 0.45 | 0.64 | 0.64 | 0.93 | 1.27 | 1.27 | 2.00 | |
| 2 | 0.45 | 0.64 | 0.64 | 0.93 | 1.27 | 1.27 | 1.59 | LH DISCARDED WITH PREFERENCE |
| 3 | 0.45 | 0.64 | 0.64 | 0.93 | 1.27 | 1.27 | 1.21 | |
| 4 | 0.45 | 0.64 | 0.64 | 0.93 | 1.27 | 1.05 | 1.21 | |
| 5 | 0.45 | 0.64 | 0.64 | 0.93 | 1.05 | 1.05 | 1.21 | |
| 6 | 0.45 | 0.64 | 0.64 | 0.93 | 1.05 | 1.05 | 1.00 | LH DISCARDED WITH PREFERENCE |
| 7 | 0.45 | 0.64 | 0.64 | 0.93 | 1.05 | 0.83 | 1.00 | |
| 8 | 0.45 | 0.64 | 0.64 | 0.93 | 0.83 | 0.83 | 1.00 | |
| ... | ... | ... | ... | ... | ... | ... | ... | |

| ID OF DISCARDING COMBINATION PATTERN | 2LL | 2HL | 2LH | 2HH | 1HL | 1LH | 1HH |
|---|---|---|---|---|---|---|---|
| 0 | 0 | 0 | 0 | 0 | 0 | 0 | 0 |
| 1 | 0 | 0 | 0 | 0 | 0 | 0 | 1 |
| 2 | 0 | 0 | 0 | 0 | 0 | 0 | 2 |
| 3 | 0 | 0 | 0 | 0 | 0 | 0 | 3 |
| 4 | 0 | 0 | 0 | 0 | 0 | 1 | 3 |
| 5 | 0 | 0 | 0 | 0 | 1 | 1 | 3 |
| 6 | 0 | 0 | 0 | 0 | 1 | 1 | 4 |
| 7 | 0 | 0 | 0 | 0 | 1 | 2 | 4 |
| 8 | 0 | 0 | 0 | 0 | 2 | 2 | 4 |
| ... | ... | ... | ... | ... | ... | ... | ... |

ENCODED DATA GENERATION APPARATUS AND A METHOD, A PROGRAM, AND AN INFORMATION RECORDING MEDIUM

The present application claims priority to the corresponding Japanese Application No. 2003-125667, filed on Apr. 30, 2003, the entire contents of which are hereby incorporated by reference.

BACKGROUND OF THE INVENTION

1. Field of the Invention

The present invention generally relates to conversion and encoding of signals, such as image signals, and specifically relates to generation of encoded data by conversion and encoding, and recompression of the encoded data.

2. Description of the Related Art

In conversion and encoding of an image using wavelet transform, technology is disclosed by Japanese Patent Publication No. JP 6-326990 A, wherein a greater number of smaller quantization steps are provided to a lower frequency subband than a higher frequency subband that is provided with a lesser number of larger (wider) quantization steps such that human vision properties are adequately reflected when linear quantization of a wavelet coefficient is performed.

Further, in order to minimize the mean square value of errors generated in a signal after reverse frequency conversion of the subband obtained by decoding a signal that is encoded by conversion and encoding, technology that uses an inverse value (or an integral multiple value thereof) of the square root of subband gain as the step size for linear quantization of each subband in the case of encoding is disclosed by J. Katto and Y. Yasuda, "Performance Evaluation of Subband Encoding and Optimization of its Filter Coefficients," Journal of Visual Communication and Image Representation, vol.2, pp. 303-313, December 1991.

As for human vision properties, a measurement example of human vision sensitivity is disclosed by J. Katto and Y. Yasuda, "Performance Evaluation of Subband Encoding and Optimization of its Filter Coefficients," Journal of Visual Communication and Image Representation, vol.2, pp. 303-313, December 1991. Further, a standard document of JPEG 2000 (refer to, for example, Yasuyuki Nomizu, "Next-Generation Image Encoding Method JPEG 2000," Triceps, Inc., Feb. 13, 2001) provides an example of weights of subbands based on the human vision sensitivity, details of which are disclosed by Marcus J. Nadenau and Julien Reichel, "Opponent Color, Human Vision and Wavelets for Image Compression," Proceedings of the Seventh Color Imaging Conference pp. 237-242, Scottsdale, Ariz., Nov. 16-19, 1999, IS&T.

Generally, a process of conversion and encoding includes frequency conversion of original signals to subbands, quantization of frequency domain coefficients constituting the subbands, and entropy encoding of the quantized coefficients, which are performed in this sequence, and is referred to as Procedure 100. Here, the subband is a group of the "frequency domain coefficients" that are classified for each of predetermined frequency bands. The "frequency domain coefficients," which are also called frequency coefficients or coefficients, are DCT coefficients if the frequency conversion is carried out by DCT (discrete cosine transform), and wavelet coefficients if the conversion is carried out by wavelet transform. Further, as is widely known, the quantization is carried out to raise the compression ratio of data, and a typical method is linear quantization wherein coefficients are divided by a constant that is called the step size. An example of this type of conversion encoding is disclosed by Yasuyuki Nomizu, "Next-Generation Image Encoding Method JPEG 2000," Triceps, Inc., Feb. 13, 2001.

Now, given that the frequency coefficients are quantized and entropy encoded by Procedure 100, when the compression ratio of encoded data is desired to be raised, decoding the entropy encoded signal, de-quantization of the frequency coefficients that are decoded, re-quantization of the de-quantized frequency coefficients, and entropy encoding have to be performed in this sequence, which is called Procedure 101. This poses a problem in that, in addition to Procedure 101 being redundant, errors at the time of de-quantization have effect at the time of re-quantization, and there is a problem of producing cumulative errors.

To cope with the problem, in recent years an encoding method, which is also known as a "post quantization" method, enabling recompression without decoding the encoded signals has been proposed. Since the recompression is performed not by decoding the encoded signal, but by discarding unnecessary codes in the state of the entropy code, cumulative errors do not occur. A representative example of the post quantization method is JPEG 2000. In such a "recompression-able" encoding method as above, first, lossless (or almost lossless) encoded data are generated and held, and then, the encoded data are recompressed at a desired compression ratio by discarding unnecessary codes as desired.

In order to enable recompression by discarding codes, a method called "bit plane encoding" is used, wherein frequency coefficients are decomposed into bit planes, and each bit plane is independently encoded. In bit plane encoding, compression is performed by outputting only selected codes of high-order bit planes, which is implemented by one of the following processes:

(i) entropy encoding is performed on only selected high-order bit planes; and (ii) entropy encoding is performed on bit planes beyond necessity (typically, all bit planes), and the entropy codes of selected low-order bit planes are discarded.

The implementation referred to above as (ii) finally outputs only the codes of selected high-order bit planes, and is the recompression. In bit plane encoding, compression is fundamentally realized by discarding bit planes, or entropy codes thereof, not by linear quantization of the coefficients. Further, as mentioned above, the post quantization can be performed either in the encoding process, or in a separate process after completing the encoding. In this specification, "post quantization" means both cases.

Now, in either case of (i) and (ii) above, a problem yet to be solved is how required high-order bit planes (or unnecessary low-order bit planes) are determined such that objectives, such as minimizing a mathematical quantization error, and optimizing subjective quality of the image, are met. This is discussed in more detail.

First, the case wherein required high-order bit planes (or, unnecessary low-order bit planes) are determined such that a mathematical quantization error (mean-square value of errors) is minimized at a given compression ratio is considered.

When the entropy encoded data are decoded, the procedure 100 is followed in the reverse sequence. Specifically, the quantized frequency coefficients are de-quantized, put into a reverse frequency conversion process, and signal values are reproduced. Here, in the reverse frequency conversion process, "a gain when the frequency coefficients are de-converted to the signal values" is different for every subband. Subband gain Gs is defined as the "square of the gain." An error Δe generated by quantization of the frequency coefficients is multiplied by the square root of the subband gain through the inverse transform for reproducing the signals, and is represented by $\sqrt{Gs}\times\Delta e$.

As disclosed by the non-patent reference 2, generally, in order to minimize the mean square errors generated in a signal after the inverse transform (the signal consisting of multiple signal values) at a given compression ratio, a simple encoding method is to perform linear quantization of each subband by the inverse value (or a value equal to the inverse value multiplied by a constant) of the square root of the subband gain. Accordingly, in the case of a conventional encoding method that does not use bit plane encoding, if coefficients are quantized by the step size (or a value equal to the step size multiplied by a constant), which is in inverse proportion to the square root of the subband gain, the mean square errors are minimized.

Now, a typical flow of the process using 5×3 wavelet transform in JPEG 2000 includes wavelet transform of an original signal to subbands, and only required high-order bit planes (or high-order sub bit planes) of wavelet coefficients are encoded for every subband, which are performed in this sequence, and called Procedure 102. Here, the sub bit planes are subsets of bit planes.

As described above, linear quantization is not performed according to the method using 5×3 wavelet transform. For this reason, the technique and means for minimizing the mean square error concerning the signal after the inverse transform of the linear quantization cannot be applied. Rather, in the case of the bit plane encoding, technique and means for determining required high-order bit planes (or unnecessary low-order bit planes) that generate the minimum mean square error have not been clarified. Much less, when a bit plane is divided into two or more subsets (i.e., sub bit planes), and encoding is performed for every sub bit plane, the technique and means for determining required high-order bit planes (or unnecessary low-order bit planes) that generate the minimum mean square error are further unclear. This is another problem to be solved.

Further, a typical flow of the process using 9×7 wavelet transform in JPEG 2000 includes wavelet transform of an original signal to subbands, linear quantization of wavelet coefficients for every subband, and encoding only required high-order bit planes (or high-order sub bit planes) of the quantized wavelet coefficients for every subband, which are performed in this sequence, and called Procedure 103.

In this case, "linear quantization of the coefficients by the step size that is in inverse proportion to the square root of the subband gain" is possible. However, performing linear quantization at the encoding stage is not suitable for the purpose of obtaining "coded data of a desired compression ratio by generating and holding lossless (or almost lossless) encoded data, and by discarding unnecessary codes as desired." While it is desirable to minimize quantization in the encoding stage, and to perform post quantization thereafter when using the 9×7 wavelet transform, the technique and means for minimizing the mean square errors generated in the signal after an inverse transform are not clear. Much less, the technique and means in the case of encoding for every sub bit plane are even less clear. This poses another problem to be solved.

Next, obtaining "the optimal quality of image for a given compression ratio" is considered.

As indicated by the patent reference 1, human vision is more sensitive to a lower frequency region than a higher frequency region. Accordingly; the human vision sensitivity is higher for quantization errors in lower frequency subbands than in higher frequency subbands. Therefore, an effective method for linear quantization of wavelet coefficients includes a smaller step size to lower frequency subbands, and a larger step size to higher frequency subbands such that the human vision sensitivity is properly reflected in the linear quantization process, as Yasuyuki Nomizu, "Next-Generation Image Encoding Method JPEG 2000," Triceps, Inc., Feb. 13, 2001 discloses.

Although this method cannot be applied to the case wherein 5×3 wavelet transform is used by JPEG 2000, it can be applied to the 9×7 wavelet transform such that "coefficients are quantized with the step size in inverse proportion to the magnitude of the human vision sensitivity corresponding to the frequency of subbands." However, it is not suitable for achieving the objective to "obtain data at a desired compression ratio by generating and holding lossless (or almost lossless) encoded data, and by discarding unnecessary codes afterwards." While it is also desirable to minimize quantization at the encoding step, and to perform post quantization afterwards, when using 9×7 wavelet transform, the technique or means for determining required high-order bit planes or high-order sub bit planes (alternatively, unnecessary low-order bit planes and low-order sub bit planes) so that the optimal quality of image can be visually obtained in the case of the post quantization are not clear. This poses another problem to be solved.

Further, considering that the human vision property is sensitive to "the quantization errors of pixels, not errors of frequency conversion coefficients," it is desirable that both the human vision sensitivity and square roots of subband gain be considered at the post quantization. In addition, in bit plane encoding, discarding codes of n low-order bit planes (representing frequency coefficients) has the same effect as carrying out linear quantization of the frequency coefficients by 2 to the n-th power, and this is the reason for the process being called post quantization.

SUMMARY OF THE INVENTION

An encoded data generation apparatus and a method, a program, and an information recording medium are described. In one embodiment, the encoded data generation apparatus for generating encoded data by carrying out frequency conversion of an input image signal to a plurality of subbands, and carrying out bit plane encoding of each of the subbands, comprises a selection unit to select low-order bit planes or low-order sub bit planes, codes corresponding to which are not to be output to the encoded data, based on a value (a) that is one of an inverse value of the square root of the gain of the inverse transform of the frequency conversion of each of the subbands; an inverse value of human vision sensitivity; and an inverse value of a product of the square root of the gain of the inverse transform and the human vision sensitivity of each of the subbands; wherein codes corresponding to greater numbers of the low-order bit planes or the low-order sub bit planes of each of the subbands are not output to the encoded data, the greater the value (a) of the subband is.

BRIEF DESCRIPTION OF THE DRAWINGS

FIG. 8 shows an example of an original image;

FIG. 10 shows the coefficient array obtained by horizontally applying wavelet transform to the coefficient array of FIG. 9;

FIG. 12 shows the coefficient array of coefficients that are obtained by twice applying 2-dimensional wavelet transform to the original image, and de-interleaving is arranged;

FIG. 13 shows an example of coefficient values of a 2LL subband;

FIG. 14 shows four bit planes of the 2LL subband of FIG. 13;

FIG. 15 shows sub bit planes of the four bit planes shown by FIG. 14;

FIG. 16 shows an example of a code sequence generated;

FIG. 17 shows an example of the square root of the subband gain of 5×3 inverse wavelet transform of a monochrome image, decomposition level being 2;

FIG. 18 shows an example of inverse values of the square root of the subband gain of 5×3 inverse wavelet transform of a monochrome image, decomposition level being 2;

FIG. 19 shows an example of the number of low-order bit planes, codes corresponding to which are not output as determined based on the values shown by FIG. 18 of a monochrome image, decomposition level being 2;

FIG. 20 shows an example of the number of low-order sub bit planes, codes corresponding to which are not output as determined based on the values shown by FIG. 18 of a monochrome image, decomposition level being 2;

FIG. 22 shows an example of the human vision sensitivity of Y component, serving as weights of subbands, based on the standard document of JPEG 2000;

FIG. 23 shows an example of the inverse values of the products of the square root of subband gain and the human vision sensitivity;

FIG. 24 shows an example of the number of low-order bit planes, codes corresponding to which are not output as determined based on the values shown by FIG. 23, the low-order bit planes being discarded;

FIG. 25 shows an example of the number of low-order sub bit planes, codes corresponding to which are not output as determined based on the values shown by FIG. 23, the low-order bit planes being discarded;

FIG. 26 shows an example of the square root of the subband gain of 9×7 inverse wavelet transform, the decomposition level being 2;

FIG. 27 is a view showing the inverse value of the value shown by FIG. 26;

FIG. 28 shows an example of the step size applied to each subband of a monochrome image, the decomposition level being 2;

FIG. 29 shows an example of the inverse values of the product of the square root of the subband gain of 9×7 inverse wavelet transform, the human vision sensitivity, and the step size of a monochrome image, the decomposition level being 2;

FIG. 30 shows an example of the number of low-order bit planes, codes corresponding to which are not output as determined by the values shown by FIG. 29;

FIG. 31 shows an example of the number of low-order sub bit planes, codes corresponding to which are not output as determined by the values shown by FIG. 29;

FIG. 32 shows square roots of the gain of reverse ICT;

FIG. 33 shows square roots of the gain of reverse RCT;

FIG. 34 shows the human vision sensitivity of the Cb component, serving as weights of subbands, based on the standard document of JPEG 2000;

FIG. 35 shows human vision sensitivity of the Cr component, serving as the weights of subbands based on the standard document of JPEG 2000;

FIG. 36 shows an example of the inverse values of the product of the square root of the subband gain of 9×7 inverse wavelet transform, human vision sensitivity, the step size, and the square root of reverse ICT conversion gain of Y, Cb, and Cr components;

FIG. 37 shows an example of the number of low-order bit planes, codes of each component corresponding to which are not output as determined by the values shown by FIG. 36, the low-order bit planes being discarded;

FIG. 38 shows an example of the number of low-order sub bit planes, codes of components corresponding to which are not output as determined by the values shown FIG. 36, the low-order bit planes being discarded;

FIG. 39 is for illustrating an example and the generation process thereof of a combination pattern of the low-order bit planes, codes corresponding to which are not output;

FIG. 41 is for illustrating an example of a combination pattern of low-order bit planes, codes corresponding to which are not to be output, in the case that there are Y, Cb, and Cr components, and a generating process thereof;

FIG. 42 is for illustrating an example of a combination pattern of the low-order sub bit planes, codes corresponding to which are not output, and a generation process thereof;

FIG. 44 is for illustrating an example and the generation process thereof of a combination pattern of the low-order sub bit planes, codes corresponding to which are not output;

DESCRIPTION OF THE PREFERRED EMBODIMENTS

Figure 1:
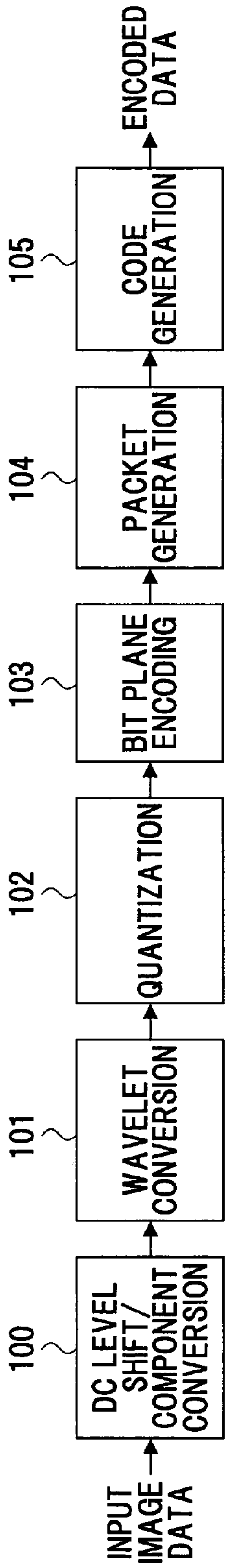
FIG. 1 is a block diagram for illustrating the algorithm of JPEG 2000.

Accordingly, embodiments of the present invention include an apparatus and a method for conversion and encoding of a signal to codes, and for recompression of the conversion encoded codes, which apparatus and method substantially obviate one or more of the problems caused by the limitations and disadvantages of the related art.

Features and advantages of embodiments of the present invention are set forth in the description that follows, and in part will become apparent from the description and the accompanying drawings, or may be learned by practice of the invention according to the teachings provided in the description. Embodiments as well as other features and advantages of the present invention will be realized and attained by an apparatus and a method for conversion and encoding of a signal to codes, and for recompression of the conversion encoded codes particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides as follows.

Embodiments of the present invention include an encoded data generation apparatus and a method thereof, including a selection unit and a selection process, respectively, wherein encoded data are generated by carrying out frequency conversion of an input signal to two or more subbands, and bit plane encoding of each subband; a value (a) is defined based on properties of each subband, specifically, by one of the following, namely, (i) an inverse value of the square root of the gain of inverse transform, which is the inverse operation of the frequency conversion, (ii) an inverse value of human vision sensitivity, and (iii) an inverse value of the product of the square root of the gain of the inverse transform and the human vision sensitivity; low-order bit planes and low-order sub bit planes, codes corresponding to which are not to be output to encoded data, are selected based on the value (a) such that the greater the value (a) of a subband is, the greater is the number of low-order bit planes and low-order sub bit planes of the subband that are discarded.

Embodiments of the present invention include an encoded data generation apparatus and a method thereof, including a selection unit and a selection process, respectively, wherein encoded data, which are obtained by carrying out frequency conversion of an input signal to two or more subbands, and carrying out bit plane encoding of each subband, are treated as an input signal for recompression. Recompression is carried out in the same manner as described above for encoding.

Data that are encoded, and recompressed, if applicable, in the manner described above reproduce the input image (original image) at a satisfactory subjective quality level having few mean square errors.

Embodiments of the present invention include an encoded data generation apparatus and a method thereof, including a selection unit and a selection process, respectively, similar to those described above, wherein a subband that is obtained by the frequency conversion of the input signal is quantized, and then bit plane encoding is carried out. In this case, the value (a) is defined based on properties of each subband, specifically, by one of the following, namely, (i) an inverse value of the product of the square root of the gain of the inverse transform, which is the reverse operation of the frequency conversion, and the quantization step size, (ii) the inverse value of the product of the human vision sensitivity and the quantization step size, and (iii) an inverse value of the product of the square root of the gain of the inverse transform, the human vision sensitivity and the quantization step size. Then, the selection unit and the selection process select low-order bit planes and low-order sub bit planes, codes corresponding to which are not to be output to encoded data, based on the value (a) such that the greater the value (a) of a subband is, the greater is the number of low-order bit planes and low-order sub bit planes of the subband that are discarded.

Embodiments of the present invention include an encoded data generation apparatus and a method thereof, including a selection unit and a selection process, respectively, wherein encoded data, which are obtained by carrying out frequency conversion of an input signal to two or more subbands, carrying out quantization of each subband, and carrying out bit plane encoding of each subband, are treated as an input signal for recompression. The recompression is performed in the same manner as described above for encoding with quantization.

Data that are encoded, and recompressed, if applicable, in the manner described above reproduce the input image (original image) at a satisfactory subjective quality level having few mean square errors.

Embodiments of the present invention include an encoded data generation apparatus and a method thereof, including a selection unit and a selection process, respectively, which are capable of handling a signal that contains multiple components.

In the case where the signal that is to be encoded contains multiple components, such as a color image, an encoding process generally includes component conversion of the signal of the original image (color conversion), frequency conversion of the signal to subbands for every component, quantization of frequency-domain coefficients that constitute each subband, and entropy encoding of the quantized coefficients, which are performed in this sequence. Here, as an example of the component conversion, RCT (reversible multiple component transform), and ICT (irreversible multiple component transform) adopted by JPEG 2000 are available.

Conversion (forward transform) and the inverse transform of RCT are expressed with the following formula.

Conversion (forward transform):

$$Y_0(x,y)=\mathrm{floor}(I_0(x,y)+2*(I_1(x,y)+I_2(x,y))/4)$$

$$Y_1(x,y)=I_2(x,y)-I_1(x,y)$$

$$Y_2(x,y)=I_0(x,y)-I_1(x,y)$$

Inverse-transform:

$$I_1(x,y)=Y_0(x,y)-\mathrm{floor}(Y_2(x,y)+Y_1(x,y))/4)$$

$$I_0(x,y)=Y_2(x,y)+I_1(x,y)$$

$$I_2(x,y)=Y_1(x,y)+I_1(x,y) \quad (1),$$

wherein I represents the original signal, and Y represents the signal after conversion. In the case of an RGB signal, for example, if the original signal I is expressed as being constituted by 0=R, 1=G, and 2=B, then the Y signal is expressed as 0=Y, 1=Cb, and 2=Cr.

Conversion and the inverse transform of ICT are expressed by the following formula.

Conversion:

$$Y_0(x,y)=0.299*I_0(x,y)+0.587*I_1(x,y)+0.144*I_2(x,y)$$

$$Y_1(x,y)=-0.16875*I_0(x,y)-0.33126*I_1(x,y)+0.5*I_2(x,y)$$

$$Y_2(x,y)=0.5*I_0(x,y)-0.41869*I_1(x,y)-0.08131*I_2(x,y)$$

Inverse transform:

$$I_0(x,y)=Y_0(x,y)+1.402*Y_2(x,y)$$

$$I_1(x,y)=Y_0(x,y)-0.34413*Y_1(x,y)-0.71414*Y_2(x,y)$$

$$I_2(x,y)=Y_0(x,y)+1.772*Y_1(x,y) \quad (2),$$

wherein I represents the original signal, and Y represents the signal after conversion. In the case of an RGB signal, for example, if the original signal I is expressed as being constituted by 0=R, 1=G, and 2=B, then the Y signal is expressed as 0=Y, 1=Cb, and 2=Cr.

As seen from the formulas (1) and (2), when reverse component conversion of each component value is performed to reproduce the original signal value, scale factors of an error generated in the reproduced original signal value due to errors generated in each component value differ for every component. The square of the scale factor is called the gain of the inverse transform of the component conversion, and is expressed as the reverse component conversion gain Gc. An error Δe generated in the frequency coefficient by quantization is multiplied by the square root of the reverse component conversion gain, resulting in $\sqrt{Gc}*\Delta e$, which causes the same influence as the subband gain as described above.

Accordingly, other embodiments of the present invention include an encoded data generation apparatus and a method thereof, including a selection unit and a selection process, respectively, for generating encoded data of an input signal containing multiple components in consideration of the influence of the reverse component conversion gain. This is realized by performing component conversion, frequency conversion to obtain multiple subbands, and bit plane encoding of each subband of each component in this sequence. Therein, the selection unit and the selection process define the value (a) based on properties of each subband of each component, namely, one of (i) an inverse value of the product of the square root of the gain of the inverse transform of the frequency conversion, and the square root of the gain of the inverse transform of the component conversion, (ii) an inverse value of the product of the square root of the human vision sensitivity and the gain of the inverse transform of and the component conversion, and (iii) an inverse value of the product of the square root of the gain of the inverse transform of the frequency conversion, the human vision sensitivity, and the square root of the gain of the inverse transform of the component conversion. Then, the selection unit and the selection process select low-order bit planes and low-order sub bit planes, codes corresponding to which are not to be output to encoded data, based on the value (a) such that the greater the value (a) of a subband is, the greater is the number of low-order bit planes and low-order sub bit planes of the subband that are discarded.

Further, embodiments of the present invention include an encoded data generation apparatus and a method thereof, including a selection unit and a selection process, respectively, for recompressing the signal containing multiple components. The recompression is performed in the same manner as described above for encoding.

Data that are encoded, and recompressed, if applicable, in the manner described above reproduce the input image (original image) containing multiple components at a satisfactory subjective quality level having few mean square errors.

Embodiments of the present invention include an encoded data generation apparatus and a method thereof, including a selection unit and a selection process, respectively, for generating encoded data of a multi-component signal by carrying out bit plane encoding after quantizing each subband of each component at a quantization step size, the subband being obtained by frequency conversion after component conversion. Therein, the selection unit and the selection process define the value (a) based on properties of each subband of each component, namely, one of (i) an inverse value of the product of the square root of the gain of the inverse transform of the frequency conversion, the square root of the gain of the inverse transform of the component conversion, and the quantization step size, (ii) an inverse value of the product of the human vision sensitivity, the square root of the gain of the inverse transform of the component conversion, and the quantization step size, and (iii) an inverse value of the product of the square root of the gain of the inverse transform of the frequency conversion, the human vision sensitivity, the square root of the gain of the inverse transform of the component conversion, and the quantization step size. Then, the selection unit and the selection process select low-order bit planes and low-order sub bit planes, codes corresponding to which are not to be output to encoded data, based on the value (a) such that the greater the value (a) of a subband is, the greater is the number of low-order bit planes and low-order sub bit planes of the subband that are discarded.

Further, embodiments of the present invention include an encoded data generation apparatus and a method thereof, including a selection unit and a selection process, respectively, for recompressing the signal containing multiple components, using quantization. The recompression is performed in the same manner as described above for encoding.

Data that are encoded, and recompressed, if applicable, in the manner described above, including the quantization process, reproduce the input image (original image) containing multiple components at a satisfactory subjective quality level having few mean square errors.

Embodiments of the present invention include an encoded data generation apparatus and a method thereof, including a selection unit and a selection process, respectively, with or without the recompression functions, wherein the number of low-order bit planes, codes corresponding to which are not to be output and the number of low-order sub bit planes, codes corresponding to which are not to be output are proportional to the value (a). In this manner, the input image (original image) is reproduced at a satisfactory subjective quality level having few mean square errors.

Embodiments of the present invention include an encoded data generation apparatus and a method thereof, including a selection unit and a selection process, respectively, for selecting a combination pattern of low-order bit planes, codes corresponding to which low-order bit planes are not to be output, by "selecting a sheet of bit plane from the least-significant-bit side of the subband that takes the greatest value (a), and the greatest value is halved," and these processes are repeated. In this manner, the input image (original image) is reproduced at a satisfactory subjective quality level having few mean square errors.

In addition, the combination pattern of the low-order bit planes, codes corresponding to which are not to be output, determined by the above process refers not only to all the patterns, but also to subsets thereof. Furthermore, the pattern can be determined by one of performing the encoded data generation process, referring to a table, and the like that are beforehand prepared. These two points are applicable to other implementations of embodiments of the present invention.

While the above process is for determining the combination pattern of the low-order bit planes, codes corresponding to which are not to be output, the process can be expanded to the case wherein a bit plane is divided into n sub bit planes for encoding. In this case, each of the n sub bit planes is conceptually considered as having n sheets of bit planes, there being a hierarchical relation of high-order sub bit planes and low-order sub bit planes. When the process is expanded as above, treating the n sub bit planes, also called n sheets of sub bit planes equally is easier than otherwise. Embodiments of the present invention also provide an encoded data generation apparatus, and a method thereof wherein the n sub bit planes are equally treated.

That is, other embodiments of the present invention include an encoded data generation apparatus and a method thereof, including a selection unit and a selection process, respectively, wherein each bit plane is divided into n sub bit planes, and then the n sub bit planes are encoded by bit plane encoding. Therein, the selection unit and the selection process select low-order sub bit planes, codes corresponding to which are not to be output, by referring to a combination pattern of lower-order sub bit planes that are determined by "selecting a sub bit plane of a sub band, the value (a) of which subband is the greatest, from the least-significant-bit side, and dividing the value (a) by $2^{1/n}$," which process is repeated. In this manner, code output can be finely controlled in units of sub bit planes, and encoding and recompression providing a satisfactory subjective quality level having few mean square errors at various compression ratios are realized.

Conversely, it is also possible to treat the n sheets of sub bit planes unequally, assigning different priorities between high order and low-order sub bit planes. When a bit plane is divided into n sub bit planes, a rate distortion slope (which is a ratio of "increment in the quantization error by not encoding a certain sub bit plane/decrement in the amount of codes by not encoding the sub bit plane") is not equal among the sub bit planes. Rather, in a general encoding method, it is designed such that the absolute value of the rate distortion slope become smaller for the low-order sub bit plane than for the high-order sub bit plane. This is because it is desirable that the bit encoding property be such that the absolute value of the rate distortion slope continually increases as codes are sequentially discarded from a low-order bit plane.

In view of the above, embodiments of the present invention include an encoded data generation apparatus and a method thereof, including a selection unit and a selection process, respectively, wherein the rate distortion slope is considered. Here, low-order sub bit planes, codes corresponding to which are not to be output are determined by a combination pattern of sub bit planes, codes corresponding to which are not to be output, determined by a process that follows. Each bit plane is divided into n sub bit planes, and each sub bit plane is encoded by bit plane encoding. The selection unit and process herein define numerical sequence $E_j (0<=j<n)$ that fulfills $\Sigma E_j=1$ (the sum is taken for all j's) and $E_j<=E_{j+1}$ for every subband; and repeats "selecting a sub bit plane of a subband i, the value (a) of which is the greatest from the least-significant-bit side, dividing the value (a) by $2^{E_{ij}}$(S), and incrementing j by 1 (however, j is made 0 (j=0) when j=n−1)," where $E_{ij}$ represents $E_j$ of the subband i.

In JPEG 2000, a bit plane can be divided into three sub bit planes, which are then encoded. In this connection, other embodiments of the present invention include an encoded data generation apparatus and a method thereof, including a selection unit and a selection process, respectively, wherein a bit plane is divided into three sub bit planes, which are then encoded with parameters being n=3, $E_{i0}=5/18$, $E_{i1}=6/18$, and $E_{i2}=7/18$.

Now, when determining low-order bit planes and low-order sub bit planes, codes corresponding to which are not to be output, there are cases where two or more subbands take the same value (a) that is determined to be the greatest. This can happen because the subband gain, the human vision sensitivity, and the quantization step size can be equal among two or more subbands. In the case of a color image containing multiple components, the gain of reverse component conversion may be equal in plural subbands. Embodiments of the present invention include an encoded data generating apparatus and a method thereof, including a selection unit and a selection process, respectively, for solving the problem of the multiple greatest values.

Accordingly, other embodiments of the present invention include an encoded data generation apparatus and a method thereof, including a selection unit and a selection process, respectively, that select a subband that has the highest frequency among subbands that have the same value (a) that is the greatest.

Further, other embodiments of the present invention include an encoded data generation apparatus and a method thereof, including a selection unit and a selection process, respectively, that select a subband that has the lowest human vision sensitivity among subbands that have the same value (a) that is the greatest.

In the following, embodiments of the present invention are described with reference to the accompanying drawings.

Since one embodiment of the present invention is suitably applicable when JPEG 2000 is used as an encoding method, the following descriptions are presented about cases wherein JPEG 2000 is used. However, embodiments of the present invention are also applicable to encoding methods other than JPEG 2000.

FIG. 1 is a block diagram showing the flow of the fundamental encoding process of JPEG 2000. An input image is processed for every rectangular region that does not overlap with another region, such region being called a tile.

In FIG. 1, Block 100 represents a processing block for performing DC level shift and component conversion (color conversion). Details of the DC level shift are described below. As the component conversion, RCT according to the formula (1), or alternatively, ICT according to the formula (2) is used, which formulae are presented in the summary above. Block 100 is not used when there is only one component, i.e., a monochrome image. Block 101 represents a processing block for performing discrete wavelet transform, which serves as frequency conversion. In JPEG 2000, reversible wavelet transform called reversible 5×3 conversion, and irreversible wavelet transform called irreversible 9×7 conversion are used. Block 102 represents a processing block for carrying out linear quantization of wavelet coefficients for every subband. The linear quantization is applied only to the case where 9×7 wavelet transform is used. Block 103 represents a processing block for carrying out bit plane encoding of the wavelet coefficients from high-order bit planes to low-order bit planes for every subband, where the wavelet coefficients may be or may not be, as applicable, linear quantized. In JPEG 2000, each bit plane can be divided into three sub bit planes, and encoded, details of which are described below. Block 104 represents a processing block for generating a packet by assembling codes (entropy codes) obtained by the bit plane encoding. Block 105 represents a processing block for generating encoded data in a predetermined format by composing packets in a predetermined sequence and adding required tag information.

The decoding process of the encoded data of JPEG 2000 is a reverse process of the encoding process described above. That is, the encoded data are decomposed (decoded) into a code sequence of each tile of each component based on the tag information. The code sequence is entropy-decoded to obtain wavelet coefficients. Further, if the 9×7 wavelet transform is used in encoding, the wavelet coefficients are de-quantized. Then, inverse wavelet transform is performed on the de-quantized wavelet coefficients, and each tile image of each component is reproduced. Further, if component conversion is performed at the time of encoding, reverse component conversion is carried out on each tile image.

Figure 2:
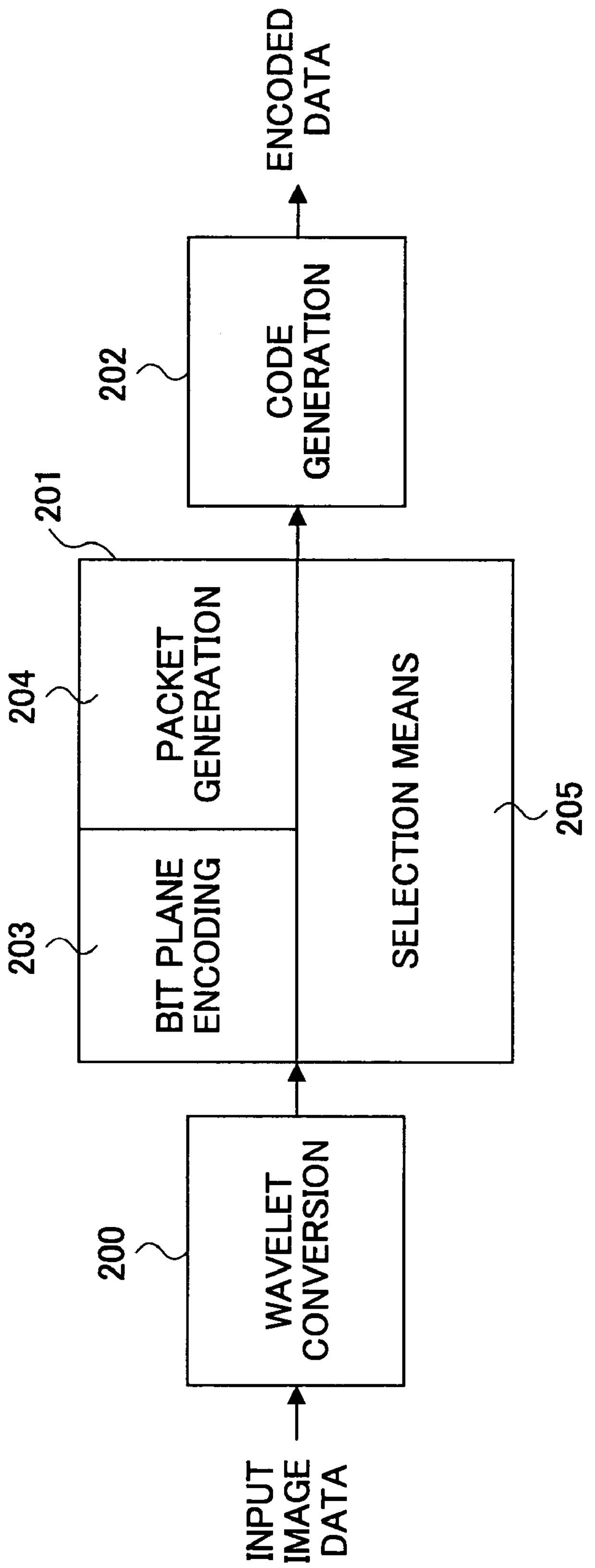
FIG. 2 is a block diagram for illustrating an apparatus and a method of encoded data generation according to an embodiment of the present invention.

FIG. 2 is a block diagram for illustrating an apparatus and a method of encoded data generation according to one embodiment of the present invention. The encoded data generation apparatus shown by FIG. 2 includes Block 200 serving as a unit to perform wavelet transform; Block 201 serving as means for bit plane encoding of the coefficients of each subband into codes, and for generating packets by composing the codes; and Block 202 serving as means for putting the generated packets in sequence, and for generating encoded data. Block 201 further includes bit plane encoding unit 203, packet generation unit 204, and selection unit 205 for selecting low-order bit planes and low-order sub bit planes, codes corresponding to which are not output. The low-order bit planes and low-order sub bit planes that are selected by the selection unit are excluded from the object of encoding by the bit plane conversion unit 203, and the corresponding codes are not generated, or alternatively, the codes (corresponding to the low-order bit planes or the low-order sub bit planes selected by the selection unit 205) are generated, and discarded by the packet generation unit 204, such that the codes are not used in generating the packets. In this manner, the codes corresponding to the selected low-order bit planes or the low-order sub bit planes are not included in the encoded data.

The encoded data generation method according to one embodiment of the present invention includes process steps corresponding to the means shown by FIG. 2.

Figure 3:
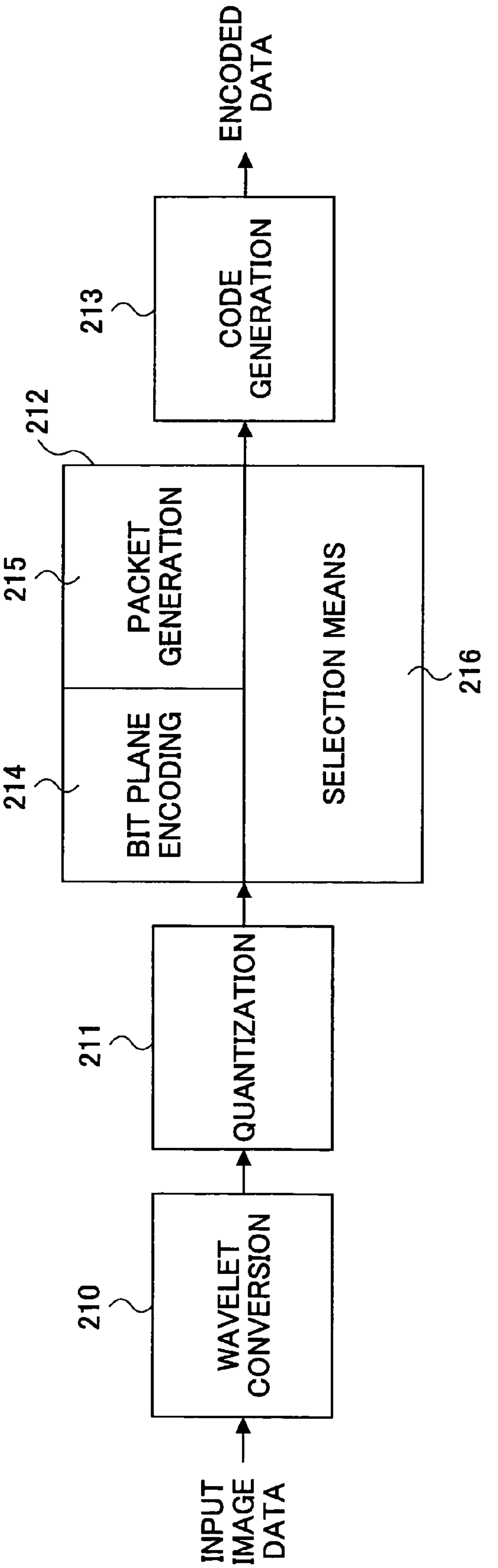
FIG. 3 is a block diagram for illustrating the apparatus and the method of encoded data generation according to the embodiment of the present invention.

Further, FIG. 3 is a block diagram for illustrating the apparatus and the method of encoded data generation according to one embodiment of the present invention. The encoded data generation apparatus as shown by FIG. 3 includes Block 210 serving as means for performing wavelet transform; Block 211 serving as means for performing linear quantization of the coefficients of each subband; Block 212 serving as means for performing bit plane encoding of the quantized coefficients of each subband, and for generating packets; and Block 213 serving as means for putting the generated packets in sequence, and for generating encoded data. Block 212 further includes bit plane encoding unit 214, packet generation unit 215, and selection unit 216 for selecting low-order bit planes and low-order sub bit planes, codes corresponding to which are not output. The low-order bit planes and low-order sub bit planes selected by the selection unit 216 are excluded from the object of encoding by the bit plane encoding unit 214, and the corresponding codes are not generated, or alternatively, the corresponding codes are generated and are discarded by the packet generation unit 215. In this manner, the corresponding codes are not included in the packet generated.

The encoded data generation method according to one embodiment of the present invention includes process steps corresponding to the means shown by FIG. 3.

Figure 4:
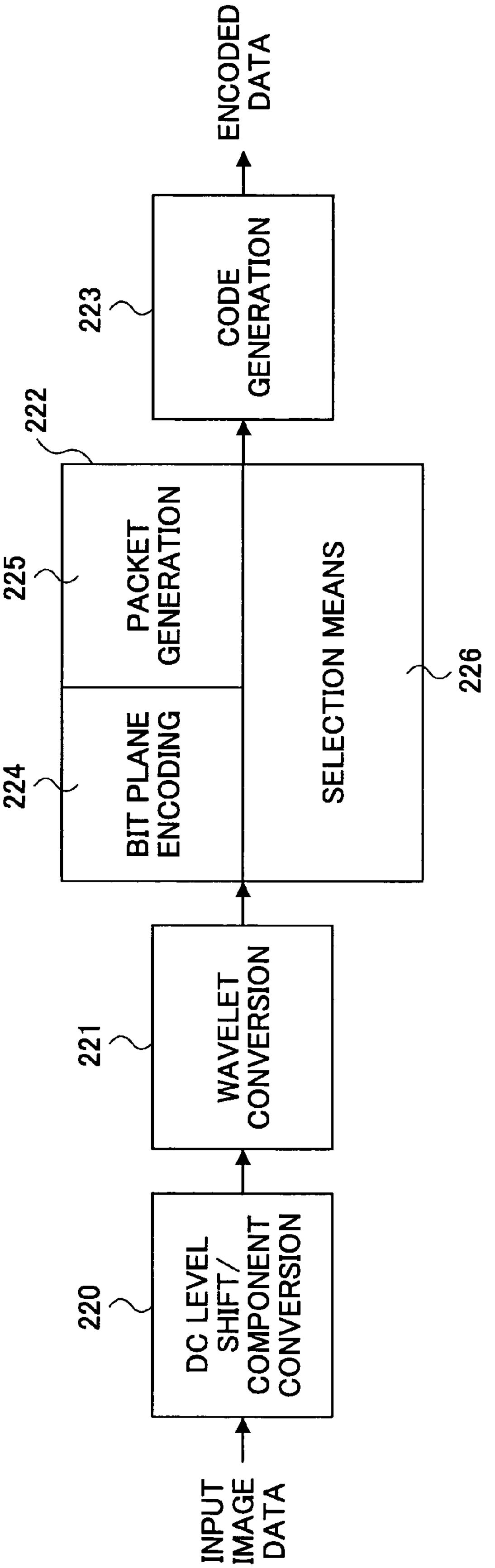
FIG. 4 is a block diagram for illustrating the apparatus and the method of encoded data generation according to the embodiment of the present invention.

Further, FIG. 4 is a block diagram for illustrating the apparatus and the method of encoded data generation according to one embodiment of the present invention. The encoded data generation apparatus shown by FIG. 4 includes Block 220 serving as means for performing DC level shift and component conversion; Block 221 serving as means for performing wavelet transform; Block 222 serving as means for performing bit plane encoding of the coefficients of each subband, and for generating packets; and Block 223 serving as means for putting the generated packets in sequence and for generating encoded data. Block 222 further includes bit plane encoding unit 224, packet generation unit 225, and selection unit 226 for selecting low-order bit planes and low-order sub bit planes, codes corresponding to which are not output. The low-order bit planes and low-order sub bit planes selected by the selection unit 226 are excluded from the object of encoding by the bit plane conversion unit 224, and the corresponding codes are not generated, or alternatively, the codes are generated and discarded by the packet generation unit 225. In this manner, the corresponding codes are not used in the packet generation.

The encoded data generation method according to one embodiment of the present invention includes process steps corresponding to the means shown by FIG. 4.

Figure 5:
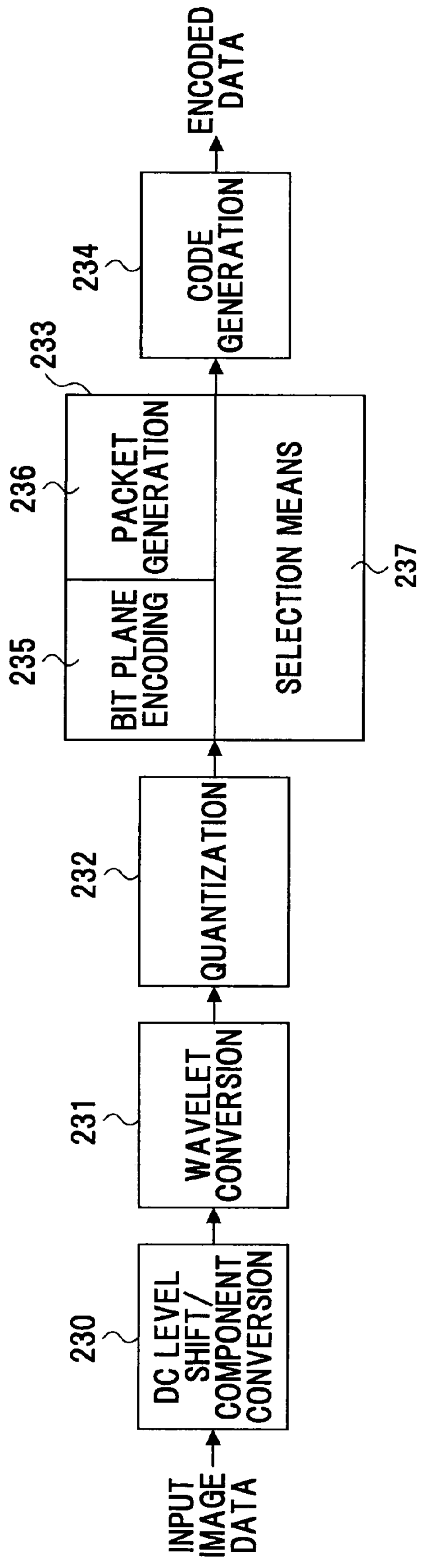
FIG. 5 is a block diagram for illustrating the apparatus and the method of encoded data generation according to the embodiment of the present invention.

Further, FIG. 5 is a block diagram for illustrating the apparatus and the method of encoded data generation according to another embodiment of the present invention. The encoded data generation apparatus shown by FIG. 5 includes Block 230 serving as means for performing DC level shift and component conversion; Block 231 serving as means for carrying out wavelet transform; Block 232 serving as means for carrying out linear quantization of the coefficients of the subbands; Block 233 serving as means for performing bit plane encoding of the coefficients of the subbands after quantization, and for generating packets; and Block 234 serving as means for putting the generated packets in sequence, and for generating encoded data. Block 233 further includes bit plane encoding unit 235, packet generation unit 236, and selection unit 237 for selecting low-order bit planes and low-order sub bit planes, codes corresponding to which are not output. The low-order bit planes and low-order sub bit planes selected by the selection unit 237 are excluded from the object of encoding by the bit plane encoding unit 235, and codes are not generated, or alternatively, codes are generated and discarded by the packet generation unit 236. In this manner, the corresponding codes are not used for packet generation.

The encoded data generation method according to one embodiment of the present invention includes process steps corresponding to the means shown by FIG. 5.

Figure 6:
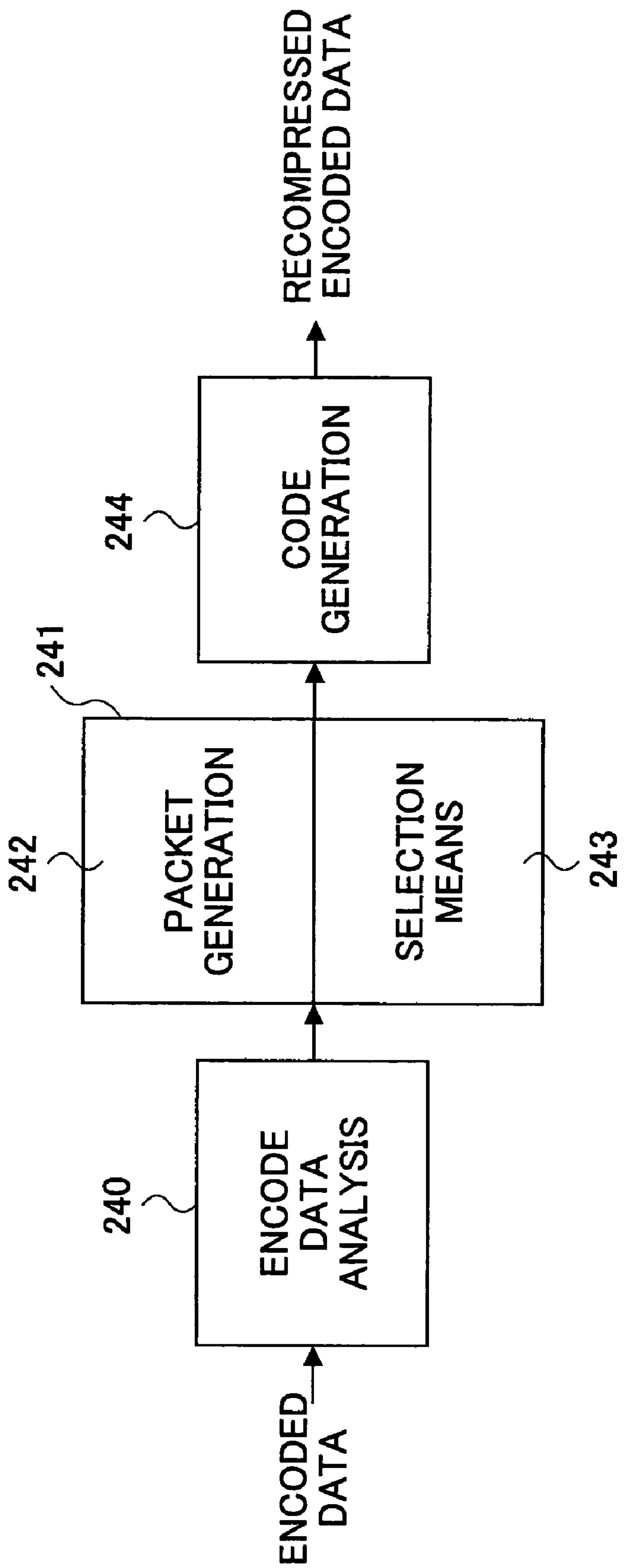
FIG. 6 is a block diagram for illustrating the apparatus and the method of encoded data generation according to the embodiment of the present invention.

Further, FIG. 6 is a block diagram for illustrating the encoded data generation apparatus according to yet another embodiment of the present invention. This embodiment is based on the fact that the encoded data of JPEG 2000 can be recompressed by discarding codes in a coded state. The encoded data generation apparatus shown by FIG. 6 includes Block 240 serving as means for taking in and analyzing lossless or almost lossless encoded data of JPEG 2000; Block 241 that further includes selection unit 243 for selecting low-order bit planes and low-order sub bit planes, codes corresponding to which are not output, and packet generating unit 242 for generating new packets from a subset of codes, the subset being the original input encoded data less the codes corresponding to the low-order bit planes or the low-order sub bit planes selected by the selection unit 243; and Block 244 serving as means for generating recompressed encoded data by putting the generated new packets in sequence and re-assigning tag information.

The encoded data generation method according to a previously described embodiment of the present invention includes processing steps corresponding to the means shown by FIG. 6.

The encoded data generation apparatus and the encoded data generation method according to the embodiments of the present invention can be realized either by hardware only, or by software using a computer, such as a personal computer and a microcomputer.

Figure 7:
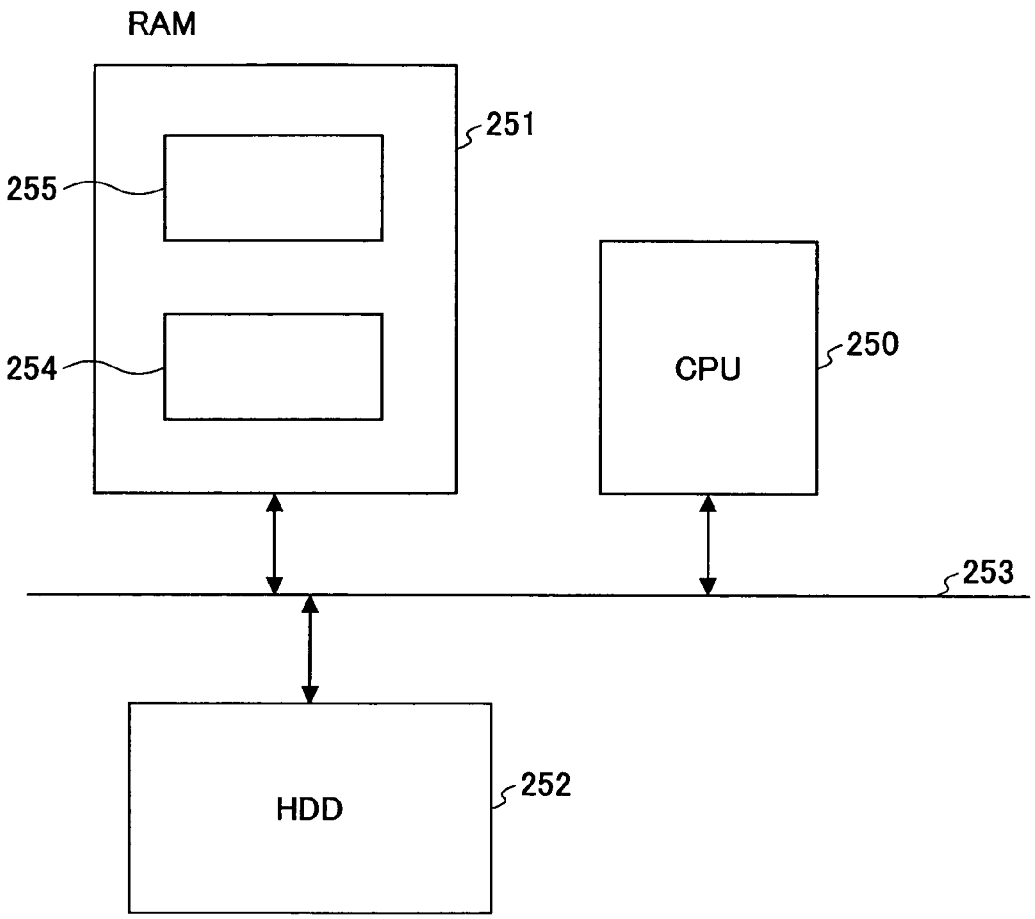
FIG. 7 is a block diagram for illustrating an implementation of the embodiment of the present invention using a computer.

Realization of embodiments of the present invention by software using a computer is explained with reference to FIG. 7. The structure shown by FIG. 7 includes CPU 250, RAM 251, a hard disk drive unit 252, and a system bus 253. The CPU 250, RAM 251, and the hard disk drive unit 252 exchange data and control information through the system bus 253. A program for realizing the means of the encoded data generation apparatus, and processing steps for the method thereof according to one embodiment of the present invention as described above is held by the hard disk drive unit 252, loaded in the RAM 251 from the hard disk drive unit 252, and executed by the CPU 250.

In the case of the encoded data generation apparatus and the method thereof according to previously-described embodiments, image data are read from the hard disk drive unit 252 to a memory area 254 of the RAM 251. These image data are provided to the CPU 250, and encoded data are generated by the CPU 250 processing the image data. The encoded data are temporarily written in another area 255 of the RAM 251, and are provided to and held by the hard disk drive unit 252.

In the case of the encoded data generation apparatus and the method thereof according to one embodiment of the present invention, encoded data are read from the hard disk drive unit 252 to the area 254 of the RAM 251. Then, the CPU 250 recompresses the encoded data, the recompressed encoded data are written in the area 255 of the RAM 251, and the recompressed encoded data are provided to and held by the hard disk drive unit 252.

Below, the wavelet transform and inverse transform thereof according to JPEG 2000 are explained.

A process of two-dimensional wavelet transform, called 5×3 conversion, of a monochrome image of 16×16 pixels adopted by JPEG2000 is explained referring to FIGS. 8 through 11, the two dimensions being the horizontal direction X and vertical direction Y. As shown by FIG. 8, an XY coordinate is taken, and a pixel value of a pixel whose Y coordinate is y is expressed as P(y), where 0<=y<=15, about a certain X coordinate.

In JPEG 2000, first, high-pass filtering is applied to each of odd-numbered pixels, namely, P(y), where y=2i+1, serving as the center pixel sandwiched by two adjacent pixels, and coefficients C(2i+1) are obtained. Next, low-pass filtering is applied to each of even-numbered pixels, namely P(y), where y=2i, serving as the center pixel sandwiched by two adjacent pixels, and coefficients C(2i) are obtained. This process is repeated for all X coordinates. Here, the high-pass filtering and the low pass filtering are expressed by the following formulas (3) and (4), respectively. In the formulas, "floor(x)" is a floor function, the value of which function is defined as an integer that is the closest to x, but not exceeding x. Here, as for the two ends of the image, namely P(0) and P(15), only one pixel that is adjacent to the center pixel is present; in this case, a pixel value is appropriately defined by a predetermined rule; however, the explanation is omitted.

$$C(2i+1)=P(2i+1)-\mathrm{floor}((P(2i)+P(2i+2))/2)\ [\mathrm{step1}] \tag{3}$$

$$C(2i)=P(2i)+\mathrm{floor}((C(2i-1)+C(2i+1)+2)/4)\ [\mathrm{step2}] \tag{4}$$

Figure 9:
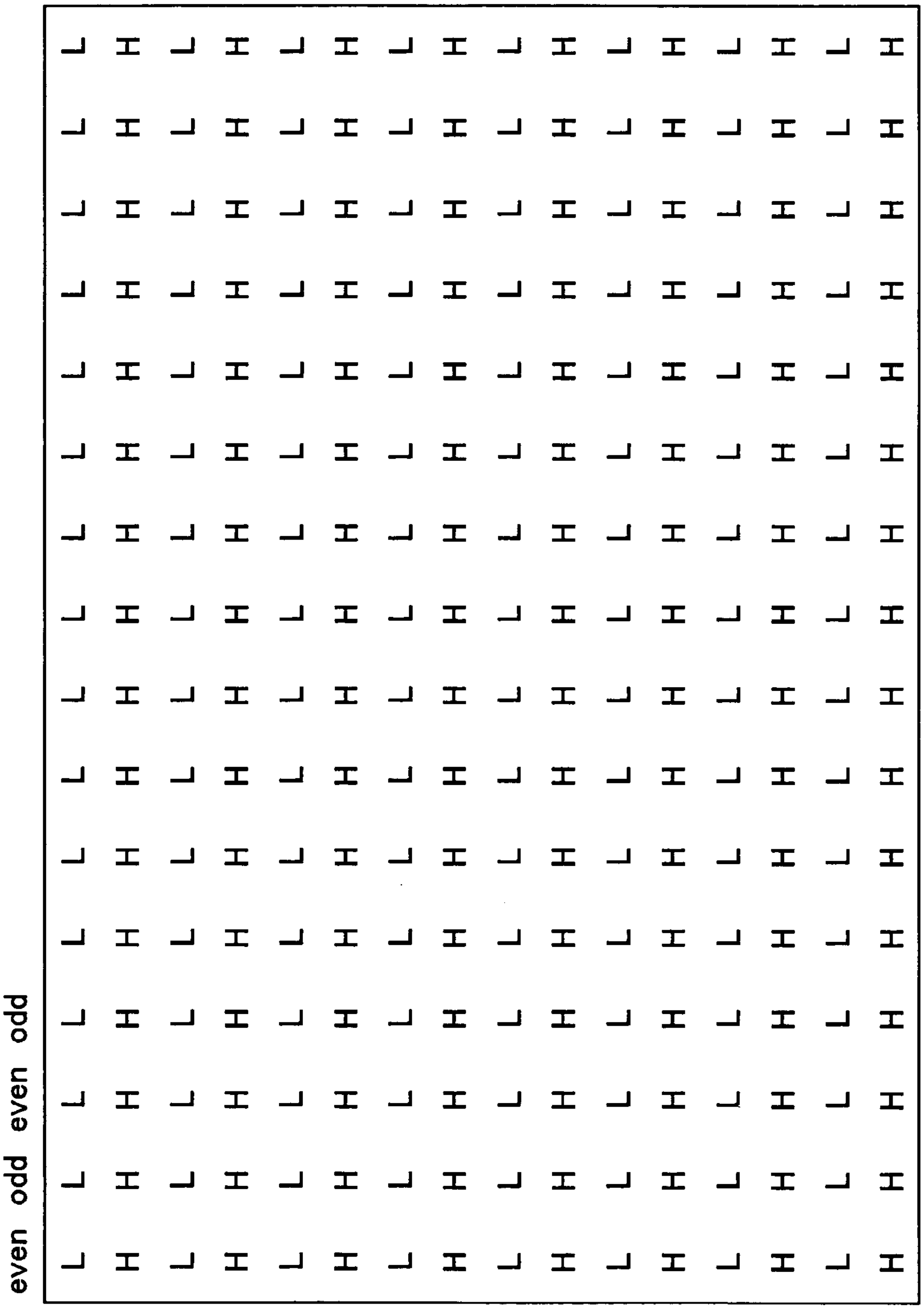
FIG. 9 shows a coefficient array obtained by vertically applying wavelet transform to the original image.

For simplicity, if the coefficients obtained by the high-pass filtering are expressed by H, and the coefficients obtained by the low-pass filtering are expressed by L, the image of FIG. 8 is expressed as shown by a coefficient array that consists of the L coefficients and the H coefficients as shown by FIG. 9 after the conversion in the vertical direction Y.

Then, high-pass filtering is applied to odd-numbered coefficients in the horizontal direction X of the coefficient array of FIG. 9, namely C(2i+1), serving as the center coefficient sandwiched by two adjacent coefficients. Next, low pass filtering is applied to even-numbered coefficients, namely C(2i), serving as the center coefficient sandwiched by two adjacent coefficients. This process is repeated for all y values. In this case, P(2i) and the like of the formulas (3) and (4) are considered representing the coefficient values.

For simplicity, the coefficients obtained by the low-pass filtering of the L coefficients are called LL, the coefficients obtained by the high-pass filtering of the L coefficients are called HL, the coefficients obtained by the low-pass filtering of the H coefficients are called LH, and the coefficients obtained by the high-pass filtering of the H coefficients are called HH. Then, the coefficient array of FIG. 9 is converted to a coefficient array as shown by FIG. 10. A group of coefficients having the same code constitutes a subband, and FIG. 10 consists of four subbands. For example, the subband consisting of the LL coefficients is called an LL subband.

Figure 11:
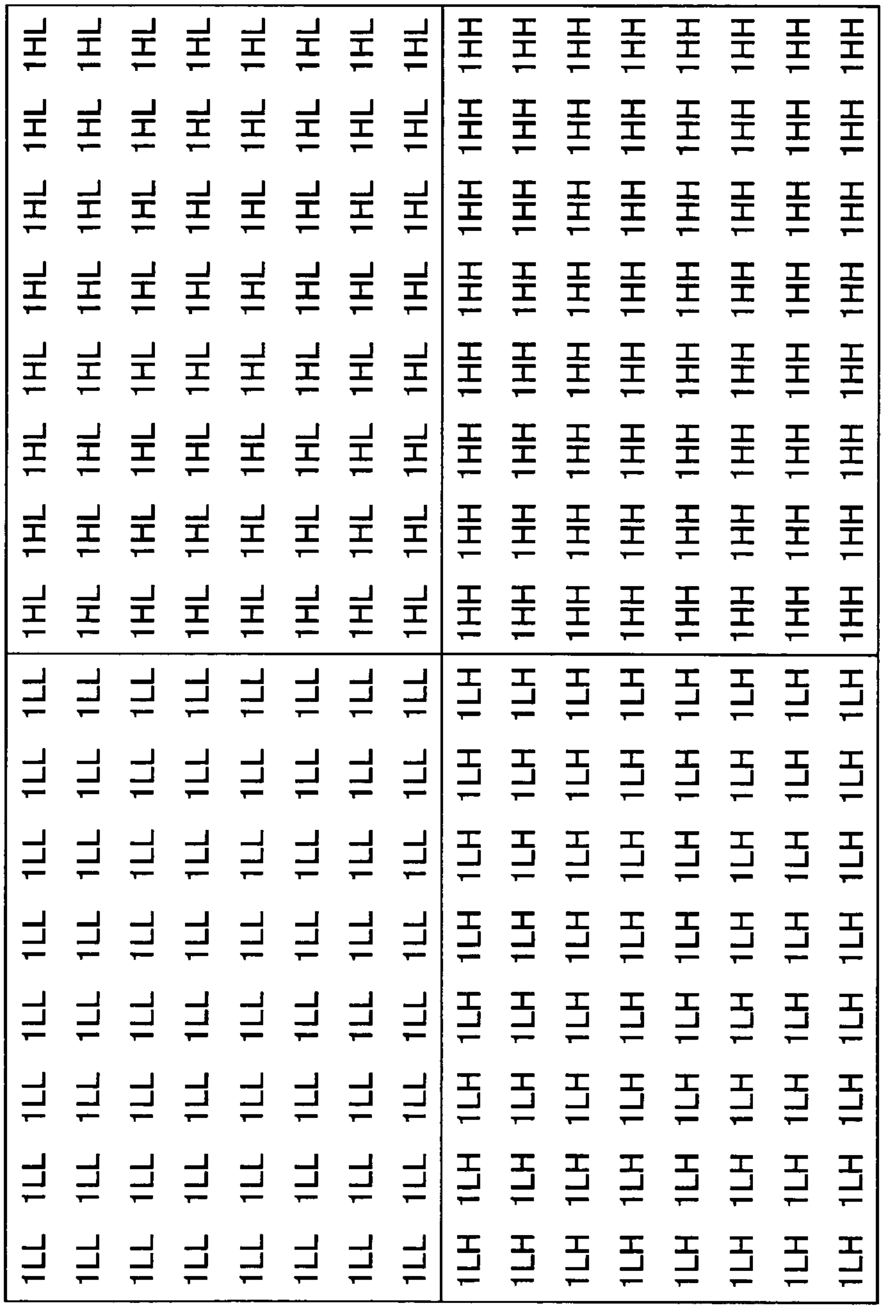
FIG. 11 shows the coefficient array after the coefficient array of FIG. 10 is de-interleaved.

In this manner, one phase of the wavelet transform (i.e., decomposition) is completed. If the LL coefficients are exclusively collected (i.e., if the coefficients are collected and arranged as shown by FIG. 11, and only the subband consisting of the LL coefficients, which is the LL subband, is considered), the original image having one half of the original resolution is obtained. Here, classifying for every subband is called "de-interleaving," and arranging the subbands as shown by FIG. 10 is called "interleaving."

Subsequent wavelet transform, which is the second phase wavelet transform, is considered with the LL subband being the target. The second phase wavelet transform is carried out on the target LL subband in the same manner as described above. FIG. 12 shows the coefficient array after collecting and rearranging coefficients obtained by the second phase wavelet transform. Here in FIG. 11 and FIG. 12, the prefix 1 and prefix 2 attached to the coefficients indicate whether each coefficient is obtained by the first wavelet transform or the second wavelet transform, respectively, and are called the decomposition level. In addition, concerning the discussion above, if a single dimensional wavelet transform is desired, what is necessary is to perform the process in only one of the directions X and Y.

The inverse transform of the 5×3 wavelet transform is performed as follows. The coefficient array such as shown by FIG. 10 to which the interleaving is carried out is the target of the inverse transform. First, reverse low-pass filtering is carried out on the even-numbered coefficients, namely C(2i), in the horizontal direction X, the coefficients serving as the center, and being sandwiched by adjacent coefficients. Then, reverse high-pass filtering is carried out on the odd-numbered coefficients, namely C(2i+1), serving as the center, and being sandwiched by adjacent coefficients. This process is repeated for all Y coordinates. Here, the reverse low pass filtering and the reverse high-pass filtering are expressed by the following formulas (5) and (6), respectively. Here, as for the two ends of the image, only one coefficient that is adjacent to the center coefficient may be present; in this case, a coefficient value is appropriately defined by a predetermined rule; however, the explanation is omitted.

$$P(2i)=C(2i)-\text{floor}((C(2i-1)+C(2i+1)+2)/4)\ [\text{step1}] \tag{5}$$

$$P(2i+1)=C(2i+1)+\text{floor}((P(2i)+P(2i+2))/2)\ [\text{step2}] \tag{6}$$

The process descried above converts the coefficient array shown by FIG. 10 to the coefficient array shown by FIG. 9, i.e., inverse transform is performed. Then, reverse low-pass filtering is performed on the even-numbered coefficients, namely C(2i), in the vertical direction Y, the coefficient serving as the center, and being sandwiched by adjacent coefficients. Then, reverse high-pass filtering is applied to odd-numbered coefficients, namely C(2i+1). This process is repeated for all X coordinates. In this manner, one phase of a wavelet inverse transform is completed, and the image as shown by FIG. 8 is reconfigured. If multiple phases of wavelet transform are carried out, the array shown by FIG. 8 is considered as an LL subband, and the same inverse transform is carried out using other coefficients, such as HL.

As mentioned above, when the 5×3 wavelet transform is used, the coefficients that constitute a subband are not quantized. Conversely, the wavelet transform called 9×7 can also be used in JPEG 2000. In this case, linear quantization is performed for every subband (an example of the step size is mentioned later).

The coefficients obtained by the wavelet transform described above are encoded by bit plane encoding. According to JPEG 2000, wavelet coefficients of sub bit planes can be encoded from high order bit (MSB) to low order bit (LSB) for every subband.

Suppose that the coefficients of a 2LL subband of FIG. 12 take values, which are decimal values, as shown by FIG. 13. When the values are processed, the values are handled as being expressed by binary numbers: For example, the value of the right-hand side bottom cell is 15 (decimal), which is considered as 1111 (binary). Then, MSBs of all the values are collected in one sheet, which is the left-hand side table of FIG. 14. The second bits of all the values are collected as shown by the second table. The third bits of all the values are collected as shown in the third table. LSBs are collected as shown in the right-hand side table. The four tables represent four bit planes. Accordingly, the example of 15 (decimal), i.e., 1111 (binary) is distributed to corresponding positions, namely, the right bottom corner of each of the four bit planes as shown by FIG. 14.

In JPEG 2000, a bit plane is classified (divided) into three sub bit planes, which are also called processing passes or encoding passes, and encoding is performed for every sub bit plane. Namely, the sub bit planes, or the encoding passes consist of a significance propagation pass (pass for encoding a coefficient that is not significant, but has significant coefficients in the circumference), a magnitude refinement pass (pass for encoding a significant coefficient), and a cleanup pass (pass for encoding the remaining bits that do not correspond to the above passes).

Nevertheless, as a result of a classification, there may be no bit that belongs to a specific sub bit plane (coding pass) in a bit plane. In this case, an empty sub bit plane is generated. The bit planes of MSBs always contain only cleanup passes.

In the case of the 2LL subband shown by FIG. 13, each of the bit planes (FIG. 14) is classified into sub bit planes (coding passes) as shown by FIG. 15, and is encoded.

Here, "significant" means a state where it is known that a target coefficient is not 0 in the encoding process so far; in other words, the target coefficient is already encoded as 1. Conversely, "not significant" means a state where the coefficient value is 0, or has a possibility of being 0; in other words, the coefficient has not been encoded as 1.

In encoding, scanning is performed from the MSB of a bit plane, and downward to the LSB, and based on whether a significant coefficient (i.e., not 0) is present in the bit plane. Three encoding passes are not performed until a significant coefficient appears. The number of bit planes that consist of only non-significant coefficients is stored in the packet header. The number is used for structuring non-significant bit planes, and for restoring the dynamic range of the coefficient at the time of decoding. Actual encoding is started from the bit plane in which a significant bit first appears, and the bit plane is first processed by the cleanup pass. Then, the process is advanced to lower-order bit planes one by one using the three encoding passes.

Now, since sub bit plane encoding is performed from high-order bit to low-order bit, a code sequence is generated, which is configured as shown by an example shown by FIG. 16. In this example, the sequence begins with codes of the 2LL subband, and finishes with codes of the 1HH subband. Further, although all the sub bit planes are encoded in the example shown by FIG. 16, codes identified by a shaded box, for example, may be dispensed with if desired. In this case, encoding of the sub bit planes in the shaded boxes can be omitted, or alternatively, encoding of the sub bit planes concerned is performed, and corresponding codes are later discarded. As mentioned above, one embodiment of the present invention is related to the selection technique for selecting the bit planes and sub bit planes that are in the shaded box. Although the smallest unit of the abbreviation (i.e., non performance) of encoding, or discarding of codes, as applicable, described above is a sub bit plane, the abbreviation and discarding are often carried out in units of bit planes for simplicity.

Next, subband gain is explained. The case of 5×3 inverse wavelet transform is discussed. The floor functions of the formulas (5) and (6) are removed, and the following approximate expressions, formulas (7) and (8), are obtained.

$$P(2i) = C(2i) - 1/4 \times C(2i-1) - 1/4 \times C(2i+1) - 1/2 \tag{7}$$

$$\begin{aligned} P(2i+1) &= C(2i+1) + P(2i)/2 + P(2i+2)/2 \\ &= -1/8 \times C(2i-1) + 1/2 \times C(2i) + 3/4 \times C(2i+1) + \\ &\quad 1/2 \times C(2i+2) - 1/8 \times C(2i+3) - 1/2 \end{aligned} \tag{8}$$

From the formulas (7) and (8), the five following formulas are obtained.

$$P(2i-1)=-\tfrac{1}{8}\times C(2i-3)+\tfrac{1}{2}\times C(2i-2)+\tfrac{3}{4}\times C(2i-1)+\tfrac{1}{2}\times C(2i)-\tfrac{1}{8}\times C(2i+1)-\tfrac{1}{2}$$

$$P(2i)=C(2i)-\tfrac{1}{4}\times C(2i-1)-\tfrac{1}{4}\times C(2i+1)-\tfrac{1}{2}$$

$$P(2i+1)=-\tfrac{1}{8}\times C(2i-1)+\tfrac{1}{2}\times C(2i)+\tfrac{3}{4}\times C(2i+1)+\tfrac{1}{2}\times C(2i+2)-\tfrac{1}{8}\times C(2i+3)-\tfrac{1}{2}$$

$$P(2i+2)=C(2i+2)-\tfrac{1}{4}\times C(2i+1)-\tfrac{1}{4}\times C(2i+3)-\tfrac{1}{2}$$

$$P(2i+3)=-\tfrac{1}{8}\times C(2i+1)+\tfrac{1}{2}\times C(2i+2)+\tfrac{3}{4}\times C(2i+3)+\tfrac{1}{2}\times C(2i+4)-\tfrac{1}{8}\times C(2i+5)-\tfrac{1}{2}$$

When a quantization error amounting to 1 arises in an odd-numbered high-pass coefficient, namely C(2i+1), the above five upper formulas show influences to 5 pixels of P(2i−1) through P(2i+3). Assuming that the five errors in the five pixels are independent, the RMS error value of the five errors is equal to the square root of $\{(-1/8)^2+(-1/4)^2+(3/4)^2+(-1/4)^2+(-1/8)^2\}=0.85$. That is, an error amounting to 1 in a high-pass coefficient is equivalent to the RMS error 0.85 of a pixel value. This is the square root of the gain of one phase of reverse high-pass filtering.

Similarly, when a quantization error amounting to 1 arises in an even-numbered low-pass coefficient C(2i), the above formulas show that the error affects three pixels, namely P(2i−1) through P(2i+1), and the RMS error value of the errors generated in the three pixels is equal to the square root of $\{(1/2)^2+1^2+(1/2)^2\}=1.1$. That is, an error amounting to 1 of a low-pass coefficient is equivalent to the RMS error 1.1 of a pixel value. This is the square root of the gain for one phase of reverse low-pass filtering.

In the case of 2-dimensional inverse wavelet transform, it is necessary to apply two phases of reverse low-pass filtering to the inverse transform of the LL coefficients. For this reason, the RMS error value of the errors generated in a pixel when a quantization error 1 arises in an LL coefficient becomes 1.1×1.1. As for the inverse transform of the HL coefficients, it is necessary to apply a phase of reverse low-pass filtering, and a phase of reverse high-pass filtering. For this reason, the RMS error value of the errors generated in a pixel when a quantization error 1 arises in an HL coefficient becomes 1.1×0.85.

Similar calculations are performed for other coefficients, and the values of RMS error (square root of subband gain) caused for a pixel generated by the unit quantization error of coefficients of each subband in the case of the decomposition level 2 become as shown by FIG. 17. That is, FIG. 17 is an example of the inverse transform of a monochrome image to which 5×3 wavelet transform to the decomposition level 2 is carried out. FIG. 18 shows inverse values of the values shown by FIG. 17.

As described above, in order to minimize the mean square errors generated in the signal after inverse transform, a simple method is to perform linear quantization of each subband by the inverse value (or a multiple thereof) of the square root of the subband gain. Accordingly, what is necessary is to obtain the number of low-order bit planes and the number of low-order sub bit planes, codes corresponding to which are not to be output in bit plane encoding (either encoding is to be omitted, or encoding is performed and generated codes are to be discarded) with reference to FIG. 18.

The number of low-order bit planes, the codes corresponding to which are not to be output, is obtained by the following formula (9).

$$\text{The number of bit planes} = k \times \log_2(1/\sqrt{Gs}) \quad (9)$$

Here, the inverse value of the square root of subband gain is expressed as $1/\sqrt{Gs}$, and k is a constant. Further, since the number of bit planes is an integer, it is necessary to round a calculation result to obtain an integer by rounding off, etc. An example of the number of low-order bit planes, codes corresponding to which are not to be output in the case of k=5 is shown by FIG. 19.

Further, the number of low-order sub bit planes, codes corresponding to which are not to be output is obtained by the following formula (10).

$$\text{The number of sub bit planes} = k \times \log_{2^{1/3}}(1/\sqrt{Gs}) \quad (10)$$

Here, the inverse value of the square root of subband gain is expressed as $1/\sqrt{Gs}$, and k is a constant. Further, since the number of the sub bit planes is an integer, the calculation result is rounded to an integer. In addition, the base of the logarithm of the formula (10) is $2^{1/3}$.

The example of the number of low-order sub bit planes, codes corresponding to which are not to be output, in the case of k=5, is shown by FIG. 20.

Here, the compression ratio becomes high as the constant k in the formulas (9) and (10) becomes greater. That is, the constant k can be selected according to a desired compression ratio.

The selection unit 205 (and the correspondence process step) according to one embodiment of the present invention as shown by FIG. 2 selects the low-order sub bit planes with reference to the number of bit planes shown by FIG. 19, and the low-order sub bit planes with reference to the number of sub bit planes shown by FIG. 20 as the low-order bit planes or the low-order sub bit planes, respectively, codes corresponding to which are not to be output.

Figure 21:
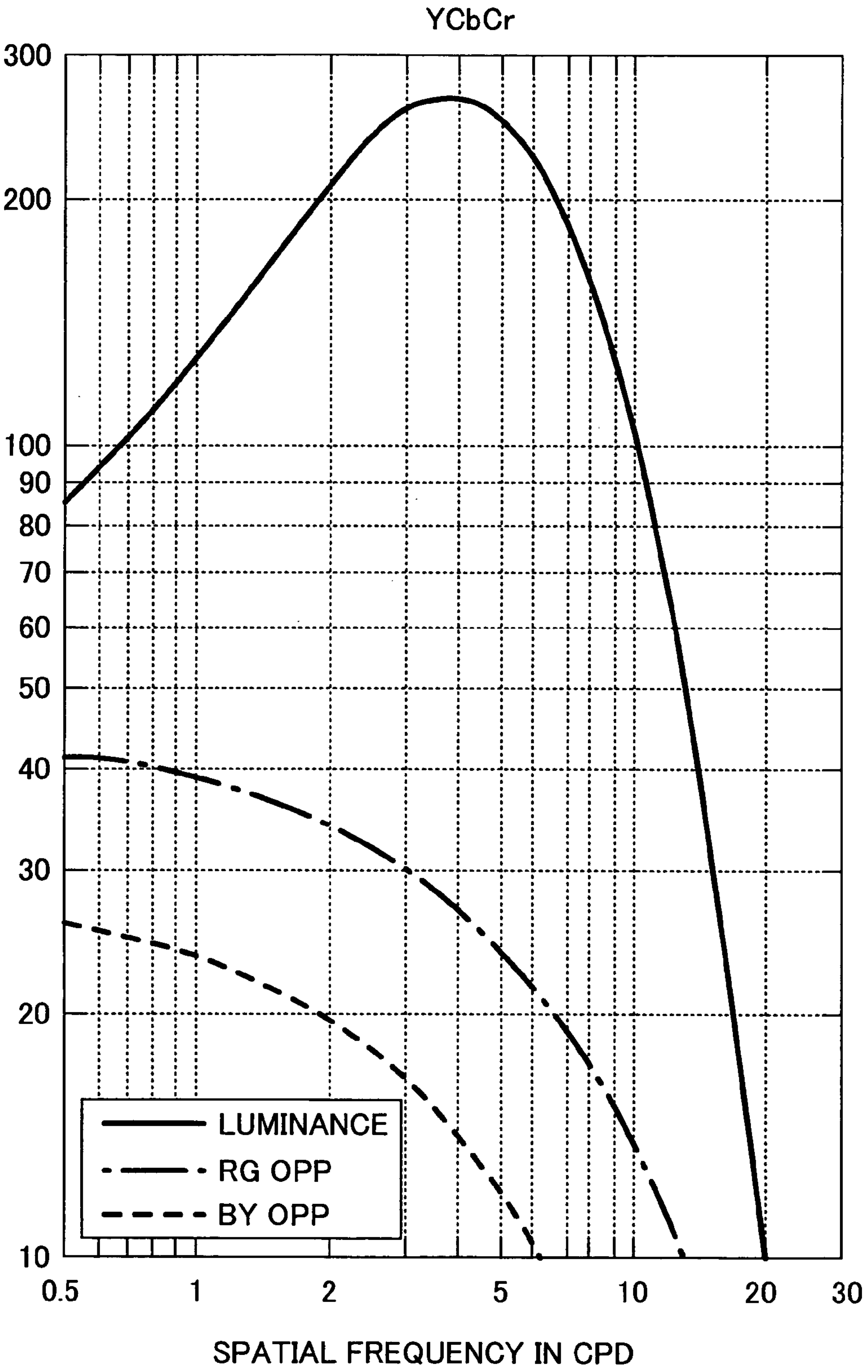
FIG. 21 is a graph showing an example of measurement of human vision sensitivity of Y, Cb and Cr components.

Next, human vision sensitivity is explained. FIG. 21 shows an example of measurement of the human vision sensitivity disclosed by the non-patent reference 3. There, the horizontal axis represents frequency of stripes (cycle/degree), and the vertical axis represents an inverse value of the minimum contrast that a person can discern (i.e., sensitivity to contrast, and a relative value). The stripes are measured for each of brightness Y, color difference Cb, and color difference Cr. The example of measurement shows that the person has high sensitivity to changes of contrast in a lower spatial frequency region, low sensitivity in a higher spatial frequency region, the highest sensitivity to the Y component, and the lowest sensitivity to the Cb component. Accordingly, the number of low-order bit planes and low-order sub bit planes, codes corresponding to which are not to be output, may be greater for subbands in the higher spatial frequency region than subbands in the lower spatial frequency region.

The standard document of JPEG 2000 provides constants (weights) based on the human vision sensitivity as shown by FIG. 22. The weight of each subband is obtained as an integral value of the human vision sensitivity curve in the frequency band that the subband concerned occupies, and the details are indicated by Marcus J. Nadenau, Julien Reichel, and Murat Kunt, “Wavelet-based Color Image Compression: Exploiting the Contrast Sensitivity Function,” IEEE Transactions on Image Processing, 2000. These values are for dividing the intervals between quantization steps (the less the weight is, the greater the intervals between quantization steps after the division become), and are calculated as being approximately proportional to the human vision sensitivity.

Depending on methods for measuring the human vision sensitivity, the sensitivity may contain gain of the reverse component conversion. In that case, it is necessary to consider that such human vision sensitivity is the product of the square root of original human vision sensitivity and the square root of the gain of the reverse component conversion. The weights shown by FIG. 22 (and FIG. 34 and FIG. 35 that are explained below) are values corresponding to the human vision sensitivity in which the gain of the reverse component conversion is not contained.

Accordingly, the number of low-order bit planes, codes corresponding to which are not to be output, and the number of low-order sub bit planes, codes corresponding to which are not to be output are obtained by substituting the inverse value of the values shown by FIG. 22 into $(1/\sqrt{Gs})$ of the formulas (9) and (10) (calculation examples are omitted), the values shown by FIG. 22 representing the human vision sensitivity. According to the embodiment of the present invention, the selection unit 205 (and the corresponding process step) shown by FIG. 2 selects as many low-order bit planes and low-order sub bit planes as determined by the above method such that codes corresponding to the selected low-order bit planes and low-order sub bit planes are not output.

In the case that the number of the low-order bit planes, codes corresponding to which are not to be output, and the number of low-order sub bit planes, codes corresponding to which are not to be output are obtained based on the inverse value of "the product of the human vision sensitivity and the square root of subband gain," the values shown by FIG. 22 can be used as the human vision sensitivity. The inverse values of "the product of the human vision sensitivity and the square root of subband gain" are calculated, and shown by FIG. 23. Then, these values are substituted into $(1/\sqrt{Gs})$ of the formulas (9) and (10), and the number of the low-order bit planes, codes corresponding to which are not to be output, and the number of low-order sub bit planes, codes corresponding to which are not to be output, are calculated, and are shown by FIG. 24 and FIG. 25, respectively. Here, the constant k is set at 5, i.e., k=5.

According to the embodiment of the present invention, the selection unit 205 (and the corresponding process step) shown by FIG. 2 selects as many low-order sub bit planes and low-order sub bit planes as shown by FIG. 24 and FIG. 25, respectively.

When using 9×7 wavelet transform in JPEG 2000, linear quantization for every subband can be carried out. FIG. 28 shows an example of the step size for the linear quantization. Further, FIG. 26 and FIG. 27 show the square root of the subband gain of 9×7 inverse wavelet transform and the inverse value thereof, respectively. The values shown by FIG. 26 and FIG. 27 are values in the case that wavelet transform of the monochrome image is carried out to the decomposition level 2.

In the case that 9×7 wavelet transform is used for encoding, but linear quantization is not performed, the number of low-order bit planes, codes corresponding to which are not to be output, and the number of low-order sub bit planes, codes corresponding to which are not to be output are determined based on the inverse value of the square root of the subband gain, that is, the values shown by FIG. 27 are substituted into $(1/\sqrt{Gs})$ of the formulas (9) and (10) (calculation examples are omitted).

Next, the cases wherein encoding is based on 9×7 wavelet transform, and linear quantization is performed is explained. According to one embodiment, the inverse value of the product of the step size and the square root of subband gain is used to determine the number of low-order bit planes, codes corresponding to which are not to be output, and the number of low-order sub bit planes, codes corresponding to which are not to be output. For this purpose, the inverse value of the product of the value of FIG. 26, and the value of FIG. 28 are obtained, and the inverse value is substituted into $(1/\sqrt{Gs})$ of the formulas (9) and (10) (calculation examples are omitted). According to the embodiment of the present invention, the selection unit 216 (and the corresponding process step) of FIG. 3 selects as many low-order bit planes and low-order sub bit planes as are determined by the method described above.

The second of the cases, wherein encoding is carried out by 9×7 wavelet transform with linear quantization, uses the inverse value of the product of the square root of the subband gain, the human vision sensitivity, and the step size for determining the number of low-order bit planes, codes corresponding to which are not to be output, and the number of low-order sub bit planes, codes corresponding to which are not to be output. For this purpose, FIG. 29 is prepared, wherein the inverse values of the product of the values of FIG. 26, the values of FIG. 22, and the values of FIG. 28 are shown. Then, the value shown by FIG. 29 is substituted into $(1/\sqrt{Gs})$ of the formulas (9) and (10), and FIG. 30 and FIG. 31, respectively, are obtained. That is, FIG. 30 and FIG. 31 show the number of low-order bit planes, codes corresponding to which are not to be output, and the number of low-order sub bit planes, codes corresponding to which are not to be output, respectively. Here, the constant k is set at 25, i.e., k=25. According to the embodiment of the present invention, the selection unit 216 (and the corresponding process step) of FIG. 3 selects as many low-order bit planes and low-order sub bit planes as are shown by FIG. 30 and FIG. 31, respectively.

According to a previously-described embodiment, wherein encoding is performed by 9×7 wavelet transform with linear quantization, the inverse value of the product of the human vision sensitivity and the step size is used for determining the number of low-order bit planes, codes corresponding to which are not to be output, and the number of low-order sub bit planes, codes corresponding to which are not to be output. For this purpose, the inverse value of the product of the value of FIG. 22 and the value of FIG. 28 is calculated, and substituted into $(1/\sqrt{Gs})$ of the formulas (9) and (10) (calculation examples are omitted). According to the embodiment of the present invention, the selection unit 216 (and the corresponding process step) of FIG. 3 selects as many low-order bit planes and low-order sub bit planes as are determined by the above method.

Next, the gain of reverse component conversion (such as reverse ICT and reverse RCT) is explained. The gain is a sum of mean square errors of the RGB values, the errors occurring due to the unit error of each component. As it is clearly understood from the derivation process of the subband gain, or the inverse transform formula of RCT and ICT, the square root of the gain of reverse ICT and the square root of the gain of reverse RCT take values as shown by FIG. 32 and FIG. 33, respectively.

Accordingly, when encoding is performed using component conversion (ICT or RCT), the inverse value of the product of the square root of the gain of reverse component conversion, and the square root of subband gain, or alternatively, the inverse value of the product of the square root of the gain of reverse component conversion, the square root of subband gain, and the step size is used for determining the number of low-order bit planes, codes corresponding to which are not to be output, and the number of low-order sub bits, codes corresponding to which are not to be output. For this purpose, values shown by one of FIG. 32 and FIG. 33, as desired, are used as the square root of the gain of reverse component conversion, and the inverse value is calculated. Then, the inverse value is substituted into $(1/\sqrt{Gs})$ of the formula (9) and (10) (calculation examples are omitted). According to the embodiment of the present invention, the selection unit 226 (and the corresponding process step) of FIG. 4 selects as many low-order bit planes and low-order sub bit planes as are determined by the method described above using the square root of the gain of reverse RCT. According to the embodiment of the present invention, the selection unit 237 (and the corresponding process step) of FIG. 5 selects as many low-order bit planes and low-order sub bit planes as are determined by the method described above using the square root of the gain of reverse ICT.

The standard document of JPEG 2000 also illustrates the weights of Cb component and Cr component as shown by FIG. 34 and FIG. 35, respectively, in addition to the weight of Y component shown by FIG. 22.

The inverse value of the product of the square root of the gain of reverse component conversion and the human vision sensitivity, or alternatively, the inverse value of the product of the square root of the subband gain, the square root of the gain of reverse component conversion, and the human vision sensitivity can also be used for determining the number of low-order bit planes, codes corresponding to which are not to be output, and the number of low-order sub bit planes, codes corresponding to which are not to be output. In this case, the values of FIG. 22, FIG. 34, and FIG. 30 are used as the human vision sensitivity of Y, Cb, and Cr, respectively. Then, the inverse value is calculated, and substituted into $(1/\sqrt{Gs})$ of the formulas (9) and (10) (calculation examples are omitted). According to the embodiment of the present invention, the selection unit 226 (and the corresponding process step) of FIG. 4 selects as many low-order bit planes and low-order sub bit planes as are determined by the method above.

In the case of performing 9×7 wavelet transform with linear quantization, using ICT as component conversion, the inverse value of the product of the square root of subband gain, the human vision sensitivity, the step size, and the square root of the gain of reverse component conversion is calculated for each component, which calculation result is shown by FIG. 36. The inverse value is substituted into $(1/\sqrt{Gs})$ of the formulas (9) and (10) such that the number of low-order bit planes, codes corresponding to which are not to be output, and the number of low-order sub bit planes, codes corresponding to which are not to be output are obtained as shown by FIG. 37 and FIG. 38, respectively. According to one embodiment of the present invention, the selection unit 237 (and the corresponding process step) of FIG. 5 selects as many low-order bit planes and low-order sub bit planes as are shown by FIG. 37 and FIG. 38, respectively.

Similarly, the number of low-order bit planes, codes corresponding to which are not to be output, and the number of low-order sub bit planes, codes corresponding to which are not to be output can be calculated based on the inverse value of the product of the square root of subband gain, the square root of the gain of reverse component conversion, and the step size; or alternatively, the inverse value of the product of the human vision sensitivity, the step size, and the square root of the gain of reverse component conversion (calculation examples are omitted). According to the embodiment of the present invention, the selection unit 237 (and the corresponding process step) of FIG. 5 selects as many low-order bit planes and low-order sub bit planes as are determined by the method above.

According to the embodiment of the present invention, the selection unit 243 of FIG. 6 selects as many low-order bit planes and low-order sub bit planes as determined by the same method as the selection unit 205 of FIG. 2, the selection unit 216 of FIG. 3, the selection unit 226 of FIG. 4, and the selection unit 237 of FIG. 5 depending on the encoding process of the encoded data that are input.

So far, the numbers of the low-order bit planes and low-order sub bit planes are obtained by using the formulas (9) and (10), respectively, codes corresponding to both planes not being output. That is, the number of combination patterns of the low-order bit planes and low-order sub bit planes is one. Of course, some different values may be given to the constant k of the formulas (9) and (10) such that two or more combination patterns of the low-order bit planes and low-order sub bit planes are prepared, and such that a compression ratio that is the closest to a desired ratio is selected from the combination patterns.

Figure 40:
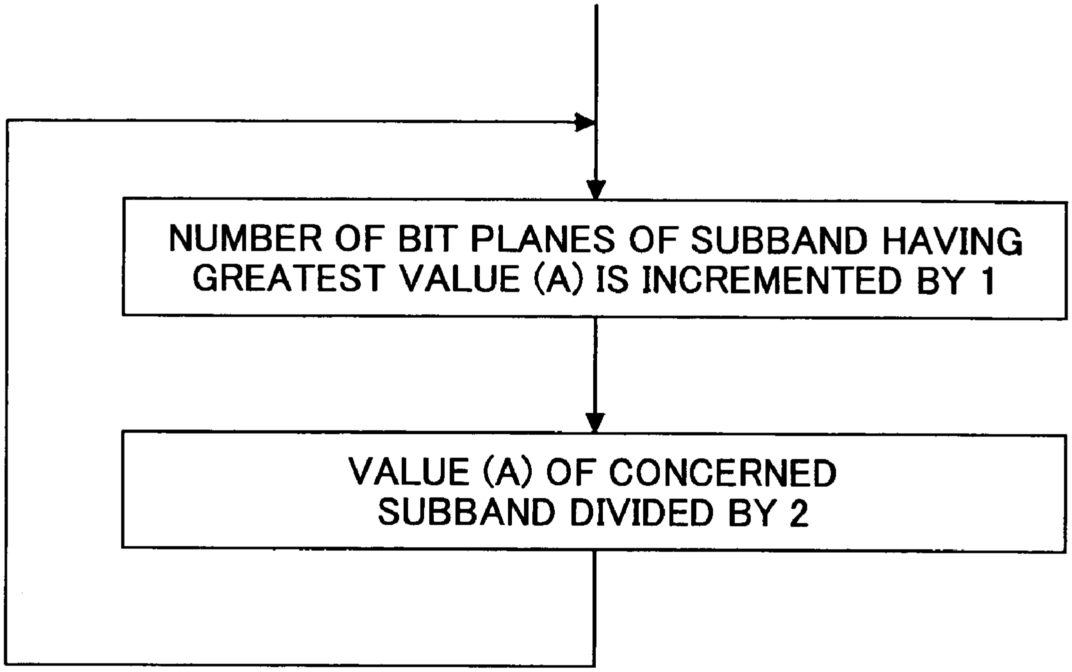
FIG. 40 is an outline flowchart of the process in reference to FIG. 39.

According to one embodiment of the present invention, a wider selection of combination patterns is made available, i.e., finer compression ratio control is possible, which is realized by a process shown by the flowchart in FIG. 40. In this manner, a combination pattern that provides a compression ratio closest to the desired compression ratio is effectively selected, and corresponding numbers of the low-order bit planes or the low-order sub bit planes, codes corresponding to which are not output, are selected.

Details follow. First, explanations are presented about the case where the combination patterns of the low-order bit planes, codes corresponding to which are not to be output, are determined one by one using inverse values, which are called values (a), of the product of the square root of the subband gain and the human vision sensitivity, the inverse numbers being shown by FIG. 23. Tables given in FIG. 39 show how the process shown by FIG. 40 is carried out. The left-hand side table of FIG. 39 shows transitions of the values (a) as the greatest of the values (a) is halved, which is repeated. Shaded boxes contain the inverse values that are halved. The right-hand side table of FIG. 39 shows the numbers of times of the inverse values of a corresponding subband having been halved.

Each line of the right-hand side table of FIG. 39 represents the combination pattern of the low-order bit planes, codes corresponding to which are not to be, and the numbers provided on the left outside of the matrix represent pattern (ID) numbers. The pattern 1 means that codes of only one sheet of low-order bit planes of the subband 1HH are not output; as for the pattern 2, codes of only one sheet each of low-order bit planes of the subbands 1HH and 1LH are not output; as for the pattern 3, codes of only one sheet of each low-order bit planes of the subbands 1HH, 1HL, and 1LH are not output; and so on. As the pattern (ID) number advances, the number of low-order bit planes, codes corresponding to which are not output increases, and the compression ratio continually becomes greater. In this manner, a sufficient number of combination patterns are prepared such that a desired pattern can be selected from the combination patterns for obtaining a compression ratio closest to the desired compression ratio, fulfilling mean square error and subjective image quality conditions.

In the case that two or more subbands have the same greatest value (a), e.g., two subbands 1HL and 1LH take the greatest value of 1.27 when the transition state shifts from 1 to 2 (refer to the right-hand side table of FIG. 39), the subband containing the highest frequency is selected, that is, in this example, 1LH (coefficient representing the horizontal edge) is treated as the subband having the greatest value (a). Similarly, in the case of four subbands having the same greatest value (a) at 0.64 when the transition shifts from 5 to 6, the same principle as described above is applied, that is, 1HL having the highest frequency is treated as the subband having the greatest value (a).

The combination patterns of the low-order bit planes, codes corresponding to which are not to be output, can be determined through the process as described above, and by using the inverse values of the product of the square root of the subband gain, the human vision sensitivity, the step size, and the gain of reverse component conversion of Y, Cb, and Cr, the inverse values serving as the value (a), and being shown by FIG. 36. In FIG. 41, the top table shows an example of the transition of the value (a). Shaded boxes indicate that the associated numbers therein are divided by 2. The lower table shows the combination patterns. However, in this example, when there are two or more subbands that have the same greatest value (a), a subband having the lowest human vision sensitivity is selected, that is, selection is carried out in the preference sequence of Cb, Cr, and Y.

The process described as above can be used with other values (a). According to the embodiment of the present invention, the selection units 205 and 216, 226, 237, and 243 shown by FIGS. 2, 3, 4, 5, and 6 (and each corresponding process step), respectively, select a combination pattern that provides a compression ratio closest to the desired compression ratio, the selection units having a table of the combination patterns beforehand determined through the process described above, and the low-order bit planes, codes corresponding to which are not to be output, are selected according to the selected combination pattern.

The combination patterns of the low-order sub bit planes, codes corresponding to which are not to be output, are determined through the same process as described above using the inverse values of the product of the square root of the subband gain and the human vision sensitivity, the inverse values serving as the values (a), and being shown by FIG. 23. In FIG. 42, the left-hand side table shows the transition of the values (a) as the greatest of the values (a) is divided by $2^{1/n}$, and the division is repeated. Shaded boxes indicate that the associated numbers therein are divided by $2^{1/n}$. The right-hand side table in FIG. 42 shows the number of low-order sub bit planes of each subband that takes the greatest value (a), and is divided by $2^{1/n}$ for every transition. Here, in this example, n is set at 3 (n=3). Numbers associated with each line of the right-hand side table are for identifying each combination pattern of the low-order sub bit planes, codes corresponding to which are not output. As the identification number advances, the number of low-order sub bit planes, codes corresponding to which are not output, increases, and the compression ratio continually increases. In this manner, a sufficient quantity of the combination patterns is available, from which a compression ratio closest to the desired compression ratio can be selected, fulfilling mean square error and subjective quality conditions.

Figure 43:
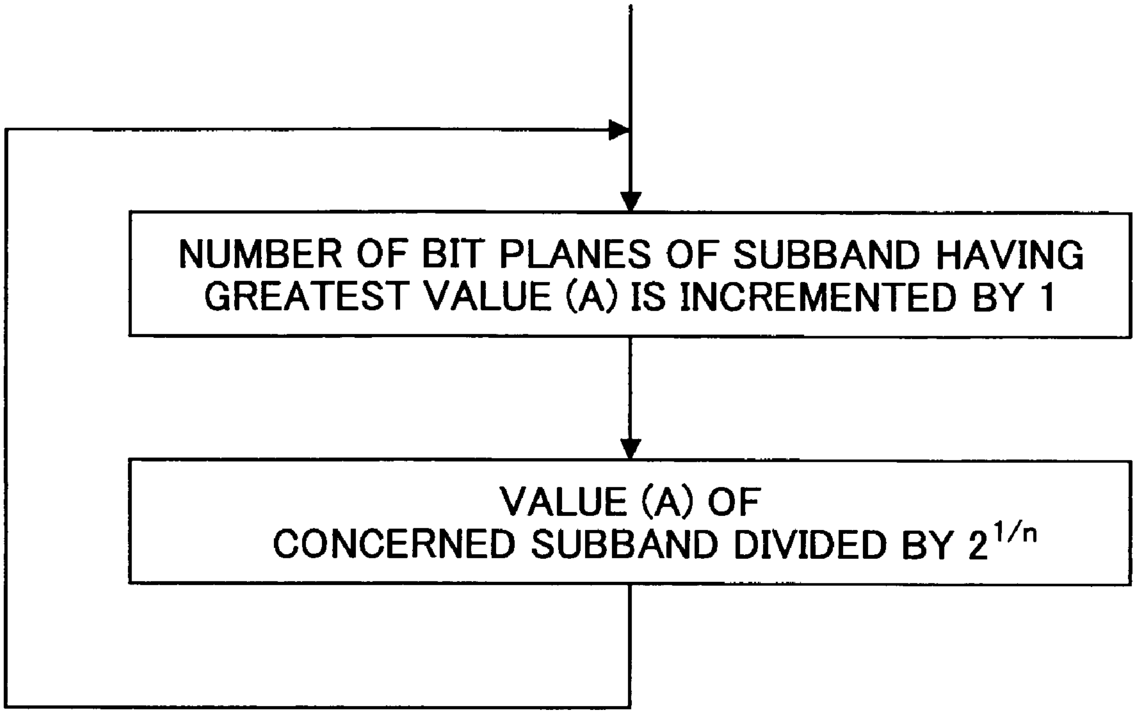
FIG. 43 is an outline flowchart of the process in reference to FIG. 42.

FIG. 43 shows the outline flow of this process. Also in this example, when there are two or more subbands having the same greatest value (a), a subband having the highest frequency is selected.

This process can be used when using values (a) other than the inverse values of the product of the square root of the subband gain and the human vision sensitivity. According to the embodiment of the present invention, the selection units 205, 216, 226, 237, and 243 (and the corresponding process step) shown by FIGS. 2, 3, 4, 5, and 6, respectively, select a combination patterns that provides a compression ratio closest to the desired compression ratio, the selection units having a table of the combination patterns beforehand determined through the process described above, and the low-order sub bit planes, codes corresponding to which are not to be output, are selected according to the selected combination pattern.

The combination patterns of the low-order sub bit planes, codes corresponding to which are not to be output, can also be determined as follows, using the inverse values of the product of the square root of subband gain and the human vision sensitivity, the inverse values serving as the value (a). Specifically, a numerical sequence $E_j$ (0<=j<n, where n is the number of sub bit planes of a bit plane) is defined for each subband, where $\Sigma E_j=1$ (summation taken for all the j's), and $E_j<=E_{j+1}$. $E_j$ of a subband i is expressed as $E_{ij}$. Then, the combination patterns are determined by "selecting the lowest-order sub bit plane of a subband i that has the greatest value (a)," the value (a) is divided by $2^{Eij}$, and j is incremented (however, when J=n−1, J is set to 0), which process is repeated.

Figure 45:
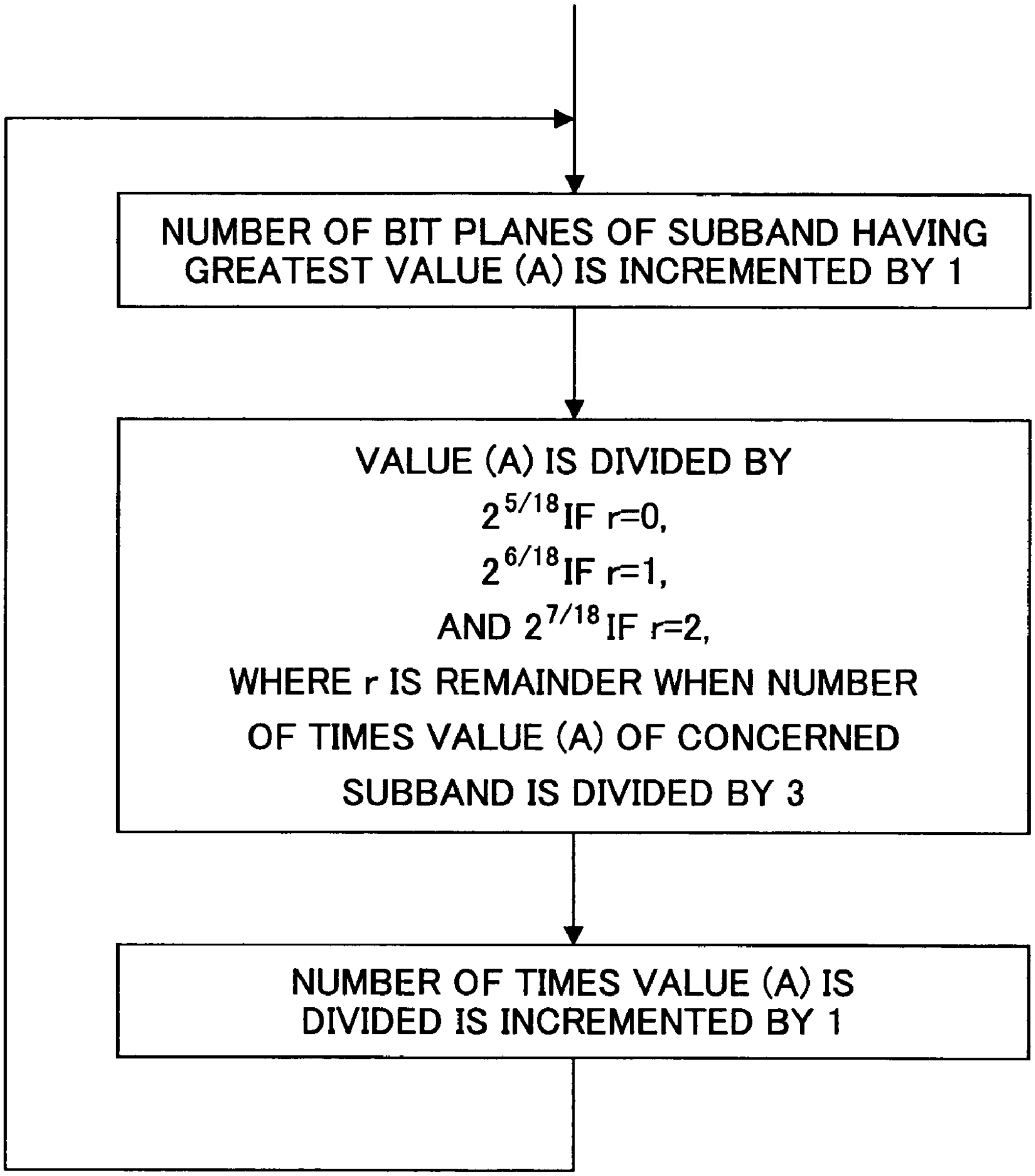
FIG. 45 is an outline flowchart of the process in reference to FIG. 44.

An example wherein n=3, $E_{i0}=5/18$, $E_{i1}=6/18$, and $E_{i2}=7/18$ is explained with reference to FIG. 44. The left table of FIG. 44 shows the transitions of the value (a), and shaded boxes indicate where the associated value (a) is determined to be the greatest, and divided. For each transition, the number of the low-order sub bit planes of the subband that is determined to have the greatest value (a) is incremented by one as shown by the right-hand side table of FIG. 44. FIG. 45 shows the outline flow of this process. Although codes are sequentially discarded from low-order sub bit plane to high-order sub bit plane in bit plane encoding as mentioned above, a desirable encoding property is that the absolute value of a rate distortion slope continually increases as the codes are discarded. This means that there is a general tendency of not generating a quantization error in the low-order sub bit planes, compared with the high-order sub bit planes, the sub bit planes constituting a bit plane. Further, this means that the step size is smaller for lower-order sub bit planes. Accordingly, in this process, when there are, e.g., three sub bit planes present, discarding of the codes of each sub bit plane is not treated at the same weight, i.e., $2^{1/3}$, but different weights are used, namely, $2^{5/18}$, $2^{6/18}=2^{1/3}$, and $2^{7/18}$ as shown by FIG. 45.

This process can be applied to where value (a) is other than the inverse value of the product of the square root of the subband gain and the human vision sensitivity. According to the embodiment of the present invention, the selection units 205, 216, 226, 237, and 243 (and the corresponding process step) shown by FIGS. 2, 3, 4, 5, and 6, respectively, select a combination pattern that provides a compression ratio closest to the desired compression ratio, the selection units having a table of the combination patterns beforehand determined through the process described above, and the low-order sub bit planes, codes corresponding to which are not to be output, are selected according to the selected combination pattern.

Figure 46:
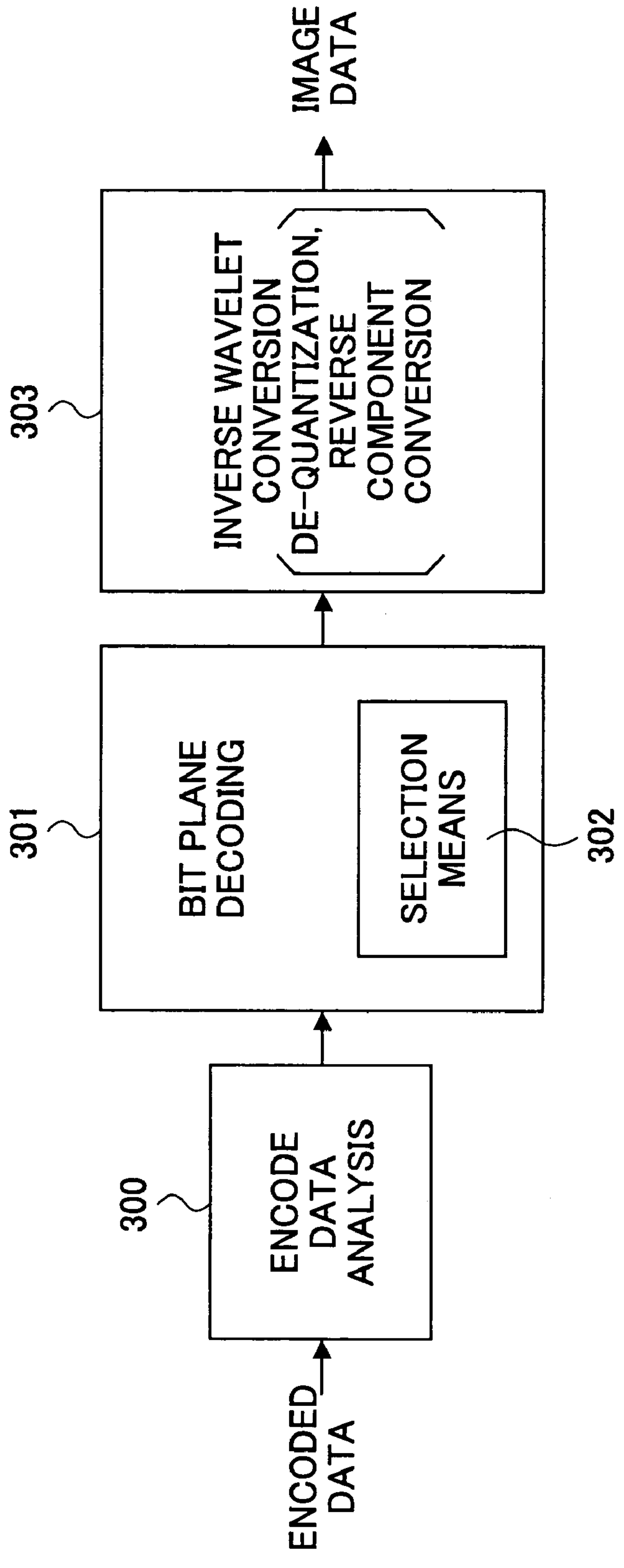
FIG. 46 is a block diagram showing a decoding apparatus to which one embodiment of the present invention is applied.

One embodiment of the present invention is applicable to an apparatus for decoding encoded data. FIG. 46 is a block diagram showing an example of such a decoding apparatus.

The decoding apparatus shown by FIG. 46 includes Block 300 serving as means for taking in and analyzing lossless encoded data of JPEG 2000; Block 301 serving as a means for bit plane decoding of the input codes, and for obtaining wavelet coefficients; and Block 303 serving as a means for carrying out a process (inverse wavelet transform, and de-quantization and/or reverse component conversion, as required) for reproducing the original image from the wavelet coefficients that are decoded. Block 301 further includes low-order sub bit plane selection unit 302 for selecting low-order sub bit planes, codes corresponding to which are not to be output, such low-order sub bit planes being determined according to the combination patterns shown in the right-hand side table of FIG. 44. Since the codes corresponding to unnecessary sub bit planes are excluded from the decoding task, decoding speed is raised.

In addition, one embodiment of the present invention includes a computer-executable program for realizing the encoded data generation apparatus as explained above, a computer-executable program for processing the encoded data generation method, and for generating the combination patterns according to the flowcharts as shown by FIG. 40, FIG. 43, and FIG. 45. One embodiment of the present invention further includes various kinds of computer-readable information recording (storage) media such as magnetic disks, optical disks, magneto-optical disks, and various semiconductor memories for storing the programs.

For reference, the DC level shift in JPEG 2000 reduces the dynamic range of a signal by a half when converting (forward transform of) positive numbers, such as RGB signal values, and doubles the dynamic range of the signal when performing the inverse transform. The conversion (forward transform) and the inverse transform are expressed by the following formula (11). In addition, this level shift is not applied to a signed integer value (that may be positive or negative), such as Cb and Cr signals of a YCbCr signal.

$I(x,y) \leftarrow I(x,y) - 2^{Ssiz(i)}$ Conversion (forward transform), and $I(x,y) \leftarrow I(x,y) + 2^{Ssiz(i)}$ Inverse transform (11)

Here, Ssiz(i) represents the bit depth of each component i of an original image (in the case of an RGB image, i=0, 1, or 2).

Further, filters for 9×7 wavelet transform are as shown below.

Conversion (forward transform):

$C(2n+1)=P(2n+1)+\alpha*(P(2n)+P(2n+2))$ [step1]

$C(2n)=P(2n)+\beta*(C(2n-1)+C(2n+1))$ [step2]

$C(2n+1)=C(2n+1)+\gamma*(C(2n)+C(2n+2))$ [step3]

$C(2n)=C(2n)+\delta*(C(2n-1)+C(2n+1))$ [step4]

$C(2n+1)=K*C(2n+1)$ [step5]

$C(2n)=(1/K)*C(2n)$ [step6]

Inverse transform:

$P(2n)=K*C(2n)$ [step1]

$P(2n+1)=(1/K)*C(2n+1)$ [step2]

$P(2n)=X(2n)\cdot-\delta*(P(2n-1)+P(2n+1))$ [step3]

$P(2n+1)=P(2n+1)\cdot-\gamma*(P(2n)+P(2n+2))$ [step4]

$P(2n)=P(2n)\cdot-\beta*(P(2n-1)+P(2n+2))$ [step5]

$P(2n)=P(2n+1)\cdot-\alpha*(P(2n)+P(2n+2))$ [step6] (12)

where, $\alpha=-1.586134342059924$ $\beta=-0.052980118572961$ $\gamma=0.882911075530934$ $\delta=0.443506852043971$ $K=1.230174104914001$ Further, as mentioned above, if 9×7 wavelet transform is selected when using JPEG 2000, linear (scalar) quantization of the wavelet coefficients can be performed for every subband. The same step size is used within the same subband. A quantization formula is shown by the following formula (13), and the step size (□b) is defined by the following formula (14).

$q_b(u,v)=\text{sign}(a_b(u,v))*\text{floor}(Ia_b(u,v)I/\Delta b)$ (13)

where $a_b(u,v)$ represents a coefficient of the subband b, $q_b(u,v)$ represents a coefficient of the subband b, and $\Delta b$ represents a quantization step size of the subband b.

$\Delta b=2^{Rb-\epsilon b}*\text{floor}(1+\mu_b/2^{11})$ (14)

where $R_b$ represents the dynamic range of the subband b, $\epsilon_b$ represents an index of the quantization of the subband b, and $\mu_b$ represents a mantissa of the quantization of the subband b.

As for use of the index $\epsilon_b$ and the mantissa $\mu_b$, there are two methods. According to the first method, referred to herein as explicit quantization and expounded quantization, the index $\epsilon_b$ and the mantissa $\mu_b$ are used in specifying all the subbands of each decomposition level. According to the second method, referred to herein as implicit quantization and derived quantization, the index $\epsilon_b$ and the mantissa $\mu_b$ are used to specify only the LL subband of the lowest-order decomposition level, with other subbands being specified by a predetermined formula.

The pair of the index $\epsilon_b$ and the mantissa $\mu_b$ $(\epsilon_b, \mu_b)$ of the implicit quantization is determined by the following formula (15).

$(\epsilon_b,\mu_b)=(\epsilon_0-N_L+n_b \text{ and } \mu_0)$ (15)

where $n_b$ represents the number of decomposition levels.

A de-quantization formula is as shown by the following formula (16).

$$\begin{aligned} Rq_b(u,v) &= (q_b(u,v) + r*2^{Mb-Nb(u,v)})^*\Delta b, \text{ if } q_b(u,v) > 0, \\ &= (qb(u,v) - r^*2^{Mb-Nb(u,v)})^*\Delta b, \\ &\quad \text{if } q_b(u,v) < 0, \text{ and} \\ &= 0, \text{ if } q_b(u,v) = 0 \end{aligned} \quad (16)$$

Figure 47:
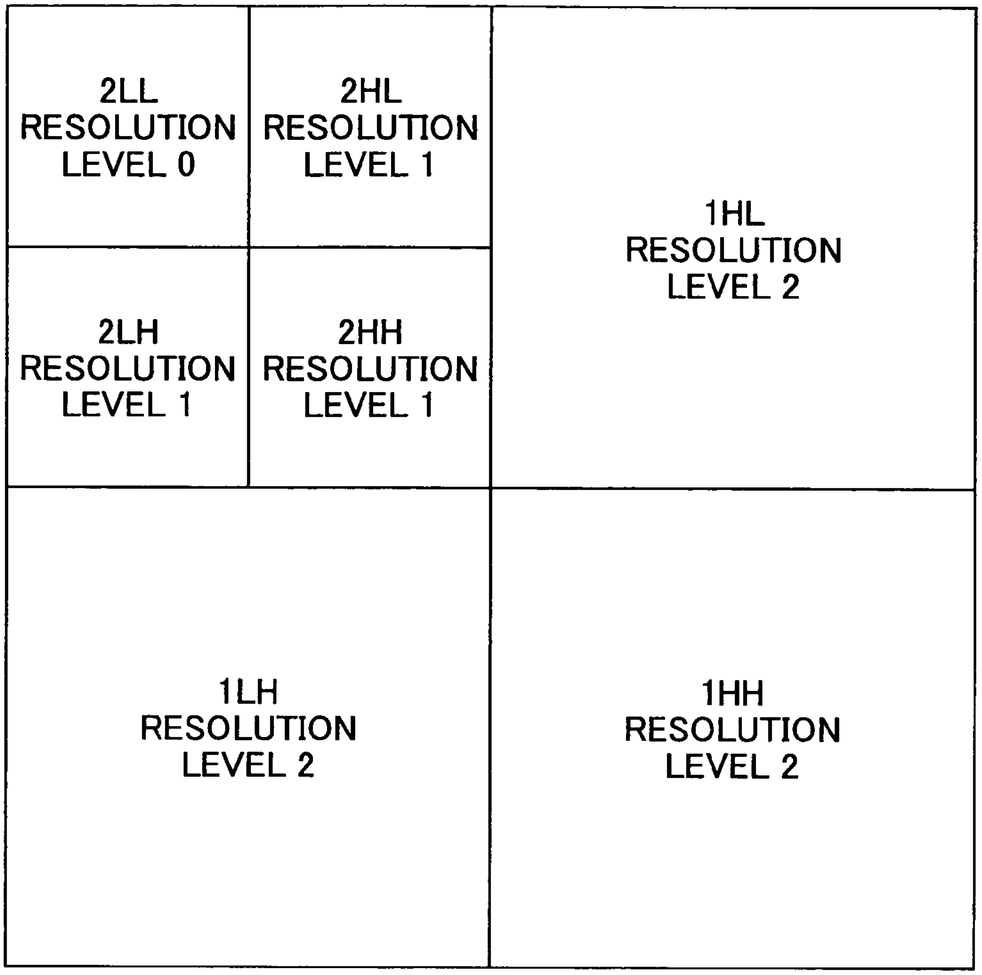
FIG. 47 shows relations between a decomposition level and a resolution level.

Further, the relation between the decomposition level and resolution level, which are often confused, is as shown by FIG. 47.

As described above, effects of one embodiment of the present invention include that data encoded and recompressed by an encoding process and a recompression process, respectively, such as processes of JPEG 2000, are encoded/recompressed by properly selecting low-order bit planes and low-order sub bit planes, codes corresponding to which are not to be output, such that a signal obtained by decoding the encoded/recompressed data reproduces the original image at a satisfactory subjective quality level having fewer mean square errors; that fine control of the compression ratio is facilitated, while providing a satisfactory quality level; and so on.

Further, the present invention is not limited to these embodiments, but various variations and modifications may be made without departing from the scope of the present invention.

The present application is based on Japanese Priority Application No.2003-125667 filed on Apr. 30, 2003 with the Japanese Patent Office, the entire contents of which are hereby incorporated by reference.

What is claimed is:

1. An encoded data generation apparatus for generating encoded data by carrying out frequency conversion of an input image signal to a plurality of subbands, and carrying out bit plane encoding of each of the subbands, comprising:

a selection unit to select low-order bit planes or low-order sub bit planes, and code corresponding to which are not to be output to the encoded data, based on a value (a) that is one of an inverse value of the square root of the gain of the inverse transform of the frequency conversion of each of the subbands; an inverse value of human vision sensitivity; and an inverse value of a product of the square root of the gain of the inverse transform and the human vision sensitivity of each of the subbands; wherein codes corresponding to greater numbers of the low-order bit planes or the low-order sub bit planes of each of the subbands are not output to the encoded data, the greater the value (a) of the subband is.

2. The encoded data generation apparatus as claimed in claim 1, wherein the number of the low-order bit planes, the codes corresponding to which are not to be output, and the number of the low-order sub bit planes, the codes corresponding to which are not to be output are proportional to the value (a).

3. The encoded data generation apparatus as claimed in claim 1, wherein the selection unit selects the low-order bit planes, the codes corresponding to which are not to be output according to a combination pattern of the lower-order bit planes, the codes corresponding to which are not to be output, the low-order bit planes being determined by selecting the bit plane of one of the subbands from a least-significant-bit side, the value (a) of which subband is the greatest, and substituting a half of the greatest value (a) for the value (a), and repeating this process.

4. The encoded data generation apparatus as claimed in claim 1, wherein each of the bit planes is divided into n of the sub bit planes for bit plane encoding, and the selection unit selects the low-order bit planes, the codes corresponding to which are not to be output according to a combination pattern of the lower-order bit planes, the codes corresponding to which are not to be output, the low-order bit planes being determined by selecting the bit plane of one of the subbands from a least-significant-bit side, the value (a) of which subband is the greatest, and substituting the value (a) divided by $2^{1/n}$ for the greatest value (a), and repeating this process.

5. The encoded data generation apparatus as claimed in claim 1, wherein each of the bit planes is divided into n of the sub bit planes for bit plane encoding, a parameter i is defined as representing one of the subbands, a parameter j is defined by a numerical sequence $E_j$, where 0<=j<n, $\Sigma E_j=1$ (sum is taken for all j's), and $E_j<=E_{j+1}$, and the selection unit selects the low-order bit planes, the codes corresponding to which are not to be output according to a combination pattern of the lower-order bit planes, the codes corresponding to which are not to be output, the low-order bit planes being determined by selecting a bit plane of one of the subbands i from a least-significant-bit side, the value (a) of which subband is the greatest, and substituting the value (a) divided by $2^{Eij''}$ for the greatest value (a), incrementing j (except that j is made 0 when j=n−1), and repeating this process.

6. The encoded data generation apparatus as claimed in claim 5, wherein n=3, $E_{i0}=5/18$, $E_{i1}=6/18$, and $E_{i2}=7/18$.

7. The encoded data generation apparatus as claimed in claim 1, wherein, in the case that two or more of the subbands have the same value (a) that is the greatest, the subband of the highest frequency is selected as the subband having the greatest value (a).

8. The encoded data generation apparatus as claimed in claim 1, wherein, in the case that two or more of the subbands have the same value (a) that is the greatest, the subband of the lowest human vision sensitivity is selected as the subband having the greatest value (a).

9. An encoded data generation apparatus for generating encoded data by carrying out frequency conversion of an input image signal to a plurality of subbands, carrying out quantization of each of the subbands, and carrying out bit plane encoding of each of the quantized subbands, comprising:

a selection unit to select low-order bit planes and low-order sub bit planes, and code corresponding to which are not to be output to the encoded data, based on a value (a) that is one of an inverse value of a product of the square root of the gain of the inverse transform of the frequency conversion and the quantization step size; an inverse value of a product of human vision sensitivity and the quantization step size; and an inverse value of a product of the square root of the gain of the inverse transform of the frequency conversion, the human vision sensitivity, and the quantization step size for each of the subbands; wherein codes corresponding to greater numbers of the low-order bit planes or the low-order sub bit planes of each of the subbands are not output to the encoded data, the greater the value (a) of the subband is.

10. An encoded data generation apparatus for generating encoded data of a signal containing a plurality of components by carrying out component conversion of an input image signal that contains multiple components, carrying out frequency conversion of each of the components to a plurality of subbands of the component, and carrying out bit plane encoding of each of the subbands of each of the components, comprising:

a selection unit to select low-order bit planes and low-order sub bit planes, and code corresponding to which are not to be output to the encoded data, based on a value (a) that is one of an inverse value of a product of the square root of the gain of the inverse transform of the frequency conversion and the square root of the gain of the inverse transform of the component conversion; an inverse value of the product of human vision sensitivity and the square root of the gain of the inverse transform of the component conversion; and an inverse value of the product of the square root of the gain of the inverse transform of the frequency conversion, the human vision sensitivity, and the square root of the gain of the inverse transform of the component conversion of each of the subbands of each of the components; wherein codes corresponding to greater numbers of the low-order bit planes or the low-order sub bit planes of each of the subbands are not output to the encoded data, the greater the value (a) of the subband is.

11. An encoded data generation apparatus for generating encoded data of a signal containing a plurality of components by carrying out component conversion, by carrying out frequency conversion of each of the components into a plurality of subbands, carrying out quantization of each of the subbands, and carrying out bit plane encoding of each of the quantized subbands of each of the components, comprising:

a selection unit to select low-order bit planes and low-order sub bit planes, and code corresponding to which are not to be output to the encoded data, based on a value (a) that is one of an inverse value of the product of the square root of the gain of the inverse transform of the frequency conversion, the square root of the gain of the inverse transform of the component conversion, and quantization step size; an inverse value of the product of human vision sensitivity, the square root of the gain of the inverse transform of the component conversion, and the quantization step size; and an inverse value of the product of the square root of the gain of the inverse transform of the frequency conversion, the human vision sensitivity, the square root of the gain of the inverse transform of the component conversion, and the quantization step size of each of the subbands of each of the components; wherein codes corresponding to greater numbers of the low-order bit planes or the low-order sub bit planes of each of the subbands are not output to the encoded data, the greater the value (a) of the subband is.

12. An encoded data generation apparatus for generating recompressed encoded data by carrying out recompression of encoded data generated by carrying out frequency conversion of an input image signal to a plurality of subbands, and carrying out bit plane encoding of each of the subbands, comprising:

a selection unit to select low-order bit planes and low-order sub bit planes, and code corresponding to which are not to be output to the recompressed encoded data, based on a value (a) that is one of an inverse value of the square root of the gain of the inverse transform of the frequency conversion of each of the subbands; an inverse value of human vision sensitivity; and an inverse value of a product of the square root of the gain of the inverse transform and the human vision sensitivity of each of the subbands; wherein codes corresponding to greater numbers of the low-order bit planes or the low-order sub bit planes of each of the subbands are not output to the recompressed encoded data, the greater the value (a) of the subband is.

13. An encoded data generation apparatus for generating recompressed encoded data by carrying out recompression of encoded data generated by carrying out frequency conversion of an input image signal to a plurality of subbands, carrying out quantization of each of the subbands, and carrying out bit plane encoding of each of the quantized subbands, comprising:

a selection unit to select low-order bit planes and low-order sub bit planes, codes corresponding to which are not to be output to the recompressed encoded data, based on a value (a) that is one of an inverse value of a product of the square root of the gain of the inverse transform of the frequency conversion and quantization step size; an inverse value of a product of human vision sensitivity and the quantization step size; and an inverse value of a product of the square root of the gain of the inverse transform of the frequency conversion, the human vision sensitivity, and the quantization step size of each of the subbands; wherein codes corresponding to greater numbers of the low-order bit planes or the low-order sub bit planes of each of the subbands are not output to the recompressed encoded data, the greater the value (a) of the subband is.

14. An encoded data generation apparatus for generating recompressed encoded data of a signal containing a plurality of components by carrying out recompression of encoded data generated by carrying out component conversion of an input image signal that contains multiple components, carrying out frequency conversion of each of the components to a plurality of subbands of the component, and carrying out bit plane encoding of each of the subbands of each of the components, comprising:

a selection unit to select low-order bit planes and low-order sub bit planes, and code corresponding to which are not to be output to the recompressed encoded data, based on a value (a) that is one of an inverse value of a product of the square root of the gain of the inverse transform of the frequency conversion and the square root of the gain of the inverse transform of the component conversion; an inverse value of the product of human vision sensitivity and the square root of the gain of the inverse transform of the component conversion; and an inverse value of the product of the square root of the gain of the inverse transform of the frequency conversion, the human vision sensitivity, and the square root of the gain of the inverse transform of the component conversion of each of the subbands of each of the components; wherein codes corresponding to greater numbers of the low-order bit planes or the low-order sub bit planes of each of the subbands are not output to the compressed encoded data, the greater the value (a) of the subband is.

15. An encoded data generation apparatus for generating recompressed encoded data of a signal containing a plurality of components by carrying out recompression of the encoded data generated by carrying out component conversion, carrying out frequency conversion of each of the components to a plurality of subbands, carrying out quantization of each of the subbands, and carrying out bit plane encoding of each of the quantized subbands of each of the components, comprising:

a selection unit to select low-order bit planes and low-order sub bit planes, and code corresponding to which are not to be output to the compressed encoded data, based on a value (a) that is one of an inverse value of the product of the square root of the gain of the inverse transform of the frequency conversion, the square root of the gain of the inverse transform of the component conversion, and quantization step size; an inverse value the product of human vision sensitivity, the square root of the gain of the inverse transform of the component conversion, and the quantization step size; and an inverse value of the product of the square root of the gain of the inverse transform of the frequency conversion, the human vision sensitivity, the square root of the gain of the inverse transform of the component conversion, and the quantization step size of each of the subbands of each of the components; wherein codes corresponding to greater numbers of the low-order bit planes or the low-order sub bit planes of each of the subbands are not output to the recompressed encoded data, the greater the value (a) of the subband is.

16. An encoded data generation method for generating encoded data by carrying out frequency conversion of an input image signal to a plurality of subbands, and carrying out bit plane encoding of each of the subbands, comprising:

selecting low-order bit planes and low-order sub bit planes, codes corresponding to which are not to be output to the encoded data, based on a value (a) that is one of an inverse value of the square root of the gain of the inverse transform of the frequency conversion of each of the subbands; an inverse value of human vision sensitivity; and an inverse value of a product of the square root of the gain of the inverse transform and the human vision sensitivity of each of the subbands; wherein codes corresponding to greater numbers of the low-order bit planes or the low-order sub bit planes of each of the subbands are not output to the encoded data, the greater the value (a) of the subband is.

17. An encoded data generation method for generating encoded data by carrying out frequency conversion of an input image signal to a plurality of subbands, carrying out quantization of each of the subbands, and carrying out bit plane encoding of each of the quantized subbands, comprising:

selecting low-order bit planes and low-order sub bit planes, codes corresponding to which are not to be output to the encoded data, based on a value (a) that is one of an inverse value of a product of the square root of the gain of the inverse transform of the frequency conversion and quantization step size; an inverse value of a product of human vision sensitivity and the quantization step size; and an inverse value of a product of the square root of the gain of the inverse transform of the frequency conversion, the human vision sensitivity, and the quantization step size of each of the subbands; wherein codes corresponding to greater numbers of the low-order bit planes or the low-order sub bit planes of each of the subbands are not output to the encoded data, the greater the value (a) of the subband is.

18. An encoded data generation method for generating encoded data of a signal containing a plurality of components by carrying out component conversion of an input image signal that contains multiple components, carrying out frequency conversion of each component to a plurality of subbands of the components, and carrying out bit plane encoding of each of the subbands of each of the components, comprising:

selecting low-order bit planes and low-order sub bit planes, codes corresponding to which are not to be output to the encoded data, based on a value (a) that is one of an inverse value of a product of the square root of the gain of the inverse transform of the frequency conversion and the square root of the gain of the inverse transform of the component conversion; an inverse value of the product of human vision sensitivity and the square root of the gain of the inverse transform of the component conversion; and an inverse value of the product of the square root of the gain of the inverse transform of the frequency conversion, the human vision sensitivity, and the square root of the gain of the inverse transform of the component conversion of each of the subbands of each of the components; wherein codes corresponding to greater numbers of the low-order bit planes or the low-order sub bit planes of each of the subbands are not output to the encoded data, the greater the value (a) of the subband is.

19. An encoded data generation method for generating encoded data of a signal containing a plurality of components by carrying out component conversion of an input signal that contains multiple components, carrying out frequency conversion of each of the components to a plurality of subbands, carrying out quantization of each of the subbands, and carrying out bit plane encoding of each of the quantized subbands of each of the components, comprising:

selecting low-order bit planes and low-order sub bit planes, codes corresponding to which are not to be output to the encoded data, based on a value (a) that is one of an inverse value of the product of the square root of the gain of the inverse transform of the frequency conversion, the square root of the gain of the inverse transform of the component conversion, and quantization step size; an inverse value of the product of human vision sensitivity, the square root of the gain of the inverse transform of the component conversion, and the quantization step size; and an inverse value of the product of the square root of the gain of the inverse transform of the frequency conversion, the human vision sensitivity, the square root of the gain of the inverse transform of the component conversion, and the quantization step size of each of the subbands of each of the components; wherein codes corresponding to greater numbers of the low-order bit planes or the low-order sub bit planes of each of the subbands are not output to the encoded data, the greater the value (a) of the subband is.

20. An encoded data generation method for generating recompressed encoded data by carrying out recompression of encoded data generated by carrying out frequency conversion of an input image signal to a plurality of subbands, and carrying out bit plane encoding of each of the subbands, comprising:

selecting low-order bit planes and low-order sub bit planes, codes corresponding to which are not to be output to the recompressed encoded data, based on a value (a) that is one of an inverse value of the square root of the gain of the inverse transform of the frequency conversion of each of the subbands; an inverse value of human vision sensitivity; and an inverse value of a product of the square root of the gain of the inverse transform and the human vision sensitivity of each of the subbands; wherein codes corresponding to greater numbers of the low-order bit planes or the low-order sub bit planes of each of the subbands are not output to the recompressed encoded data, the greater the value (a) of the subband is.

21. An encoded data generation method for generating recompressed encoded data by carrying out recompression of encoded data generated by carrying out frequency conversion of an input image signal to a plurality of subbands, carrying out quantization of each of the subbands, and carrying out bit plane encoding of each of the quantized subbands, comprising:

selecting low-order bit planes and low-order sub bit planes, codes corresponding to which are not to be output to the recompressed encoded data, based on a value (a) that is one of an inverse value of a product of the square root of the gain of the inverse transform of the frequency conversion and quantization step size; an inverse value of a product of human vision sensitivity and the quantization step size; and an inverse value of a product of the square root of the gain of the inverse transform of the frequency conversion, the human vision sensitivity, and the quantization step size of each of the subbands; wherein codes corresponding to greater numbers of the low-order bit planes or the low-order sub bit planes of each of the subbands are not output to the recompressed encoded data, the greater the value (a) of the subband is.

22. An encoded data generation method for generating recompressed encoded data of a signal containing a plurality of components by carrying out recompression of encoded data generated by carrying out component conversion of an input image signal that contains multiple components, carrying out frequency conversion of each of the components to a plurality of subbands of each of the components, and carrying out bit plane encoding of each of the subbands of each of the components, comprising:

selecting low-order bit planes and low-order sub bit planes, codes corresponding to which are not to be output to the recompressed encoded data, based on a value (a) that is one of an inverse value of a product of the square root of the gain of the inverse transform of the frequency conversion and the square root of the gain of the inverse transform of the component conversion; an inverse value of the product of human vision sensitivity and the square root of the gain of the inverse transform of the component conversion; and an inverse value of the product of the square root of the gain of the inverse transform of the frequency conversion, the human vision sensitivity, and the square root of the gain of the inverse transform of the component conversion of each of the subbands of each of the components; wherein codes corresponding to greater numbers of the low-order bit planes or the low-order sub bit planes of each of the subbands are not output to the compressed encoded data, the greater the value (a) of the subband is.

23. An encoded data generation method for generating recompressed encoded data of a signal containing a plurality of components by carrying out recompression of encoded data generated by carrying out component conversion, carrying out frequency conversion of each of the components into a plurality of subbands, carrying out quantization of each of the subbands, and carrying out bit plane encoding of each of the quantized subbands of each of the components, comprising:

selecting low-order bit planes and low-order sub bit planes, codes corresponding to which are not to be output to the compressed encoded data, based on a value (a) that is one of an inverse value of the product of the square root of the gain of the inverse transform of the frequency conversion, the square root of the gain of the inverse transform of the component conversion, and quantization step size; an inverse value of the product of human vision sensitivity, the square root of the gain of the inverse transform of the component conversion, and the quantization step size; and an inverse value of the product of the square root of the gain of the inverse transform of the frequency conversion, the human vision sensitivity, the square root of the gain of the inverse transform of the component conversion, and the quantization step size of each of the subbands of each of the components; wherein codes corresponding to greater numbers of the low-order bit planes or the low-order sub bit planes of each of the subbands are not output to the recompressed encoded data, the greater the value (a) of the subband is.

24. An article of manufacture having one or more recordable medium storing instructions thereon which, when executed by a system, cause the system to determine a combination pattern of the low-order bit planes, the codes corresponding to which are not to be output, and the low-order sub bit planes, the codes corresponding to which are not to be output, according to the selection process comprising:

selecting low-order bit planes and low-order sub bit planes, codes corresponding to which are not to be output to the encoded data, based on a value (a) that is one of an inverse value of the square root of the gain of the inverse transform of the frequency conversion of each of the subbands; an inverse value of human vision sensitivity; and an inverse value of a product of the square root of the gain of the inverse transform and the human vision sensitivity of each of the subbands; wherein codes corresponding to greater numbers of the low-order bit planes or the low-order sub bit planes of each of the subbands are not output to the encoded data, the greater the value (a) of the subband is.

* * * * *